(12) United States Patent
Bernier

(10) Patent No.: US 8,171,514 B2
(45) Date of Patent: May 1, 2012

(54) MANAGING FAVORITE CHANNELS

(76) Inventor: Nicklas P. Bernier, Duluth, GA (US)

( * ) Notice: Subject to any disclaimer, the term of this patent is extended or adjusted under 35 U.S.C. 154(b) by 1223 days.

(21) Appl. No.: 10/224,780

(22) Filed: Aug. 21, 2002

(65) Prior Publication Data
US 2004/0040039 A1 Feb. 26, 2004

(51) Int. Cl.
G06F 13/00 (2006.01)
G06F 3/00 (2006.01)
H04N 5/445 (2011.01)

(52) U.S. Cl. ............... 725/46; 725/44; 725/47; 725/52

(58) Field of Classification Search .............. 725/39, 725/43, 45, 46, 44, 47, 52; 345/821, 823, 345/838
See application file for complete search history.

(56) References Cited

U.S. PATENT DOCUMENTS

| | | | |
|---|---|---|---|
| 5,323,240 A | 6/1994 | Amano et al. | |
| 5,564,088 A | 10/1996 | Saitoh | |
| 5,583,560 A * | 12/1996 | Florin et al. | 725/40 |
| 5,822,123 A * | 10/1998 | Davis et al. | 725/43 |
| 5,844,620 A | 12/1998 | Coleman et al. | |
| 6,002,394 A * | 12/1999 | Schein et al. | 725/39 |
| 6,014,184 A * | 1/2000 | Knee et al. | 725/45 |
| 6,075,526 A * | 6/2000 | Rothmuller | 715/721 |
| 6,133,909 A * | 10/2000 | Schein et al. | 715/721 |
| 6,141,003 A | 10/2000 | Chor et al. | |
| 6,177,931 B1 | 1/2001 | Alexander et al. | |
| 6,198,513 B1 | 3/2001 | Cherrick | |
| 6,295,646 B1 | 9/2001 | Goldschmidt et al. | |
| 6,425,129 B1 * | 7/2002 | Sciammarella et al. | 725/38 |
| 6,438,752 B1 | 8/2002 | McClard | |
| 6,445,398 B1 * | 9/2002 | Gerba et al. | 345/721 |
| 6,518,986 B1 * | 2/2003 | Mugura | 715/810 |
| 6,536,041 B1 * | 3/2003 | Knudson et al. | 725/39 |
| 7,047,548 B2 | 5/2006 | Bates et al. | |
| 7,313,806 B1 * | 12/2007 | Williams et al. | 725/46 |
| 2001/0005905 A1 * | 6/2001 | Saib et al. | 725/57 |
| 2002/0056098 A1 | 5/2002 | White | |
| 2002/0078457 A1 | 6/2002 | Nishikawa et al. | |
| 2002/0122079 A1 * | 9/2002 | Kamen et al. | 345/863 |
| 2002/0152459 A1 | 10/2002 | Bates et al. | |
| 2003/0018972 A1 | 1/2003 | Arora | |
| 2003/0018973 A1 | 1/2003 | Thompson | |
| 2003/0103088 A1 * | 6/2003 | Dresti et al. | 345/835 |

FOREIGN PATENT DOCUMENTS

| | | |
|---|---|---|
| AU | 2330597 | 10/1997 |
| BR | 9708196 | 7/1999 |
| CA | 2251726 | 9/1997 |
| CN | 1218598 | 6/1999 |
| DE | 69714712 | 5/2002 |
| DE | 69736137 | 4/2007 |
| ES | 2182058 | 3/2003 |

(Continued)

OTHER PUBLICATIONS

The latest Office Action dated Apr. 1, 2008 for U.S. Appl. No. 10/376,863.

Primary Examiner — Hunter Lonsberry
(74) Attorney, Agent, or Firm — Merchant & Gould

(57) ABSTRACT

A system is described that provides for scrolling among favorite channels with a remote control device, preferably through user interaction with channel keys. Some embodiments also provide for enhanced management of favorite channels.

60 Claims, 33 Drawing Sheets

FOREIGN PATENT DOCUMENTS

| | | |
|---|---|---|
| ES | 2266399 | 3/2007 |
| JP | 2000507408 | 6/2000 |
| WO | 97/34414 | 9/1997 |
| WO | 97/37490 | 10/1997 |
| WO | 00/01142 | 1/2000 |
| WO | 01/45395 | 6/2001 |
| WO | 02/087243 | 10/2002 |
| WO | 03/052554 | 6/2003 |

* cited by examiner

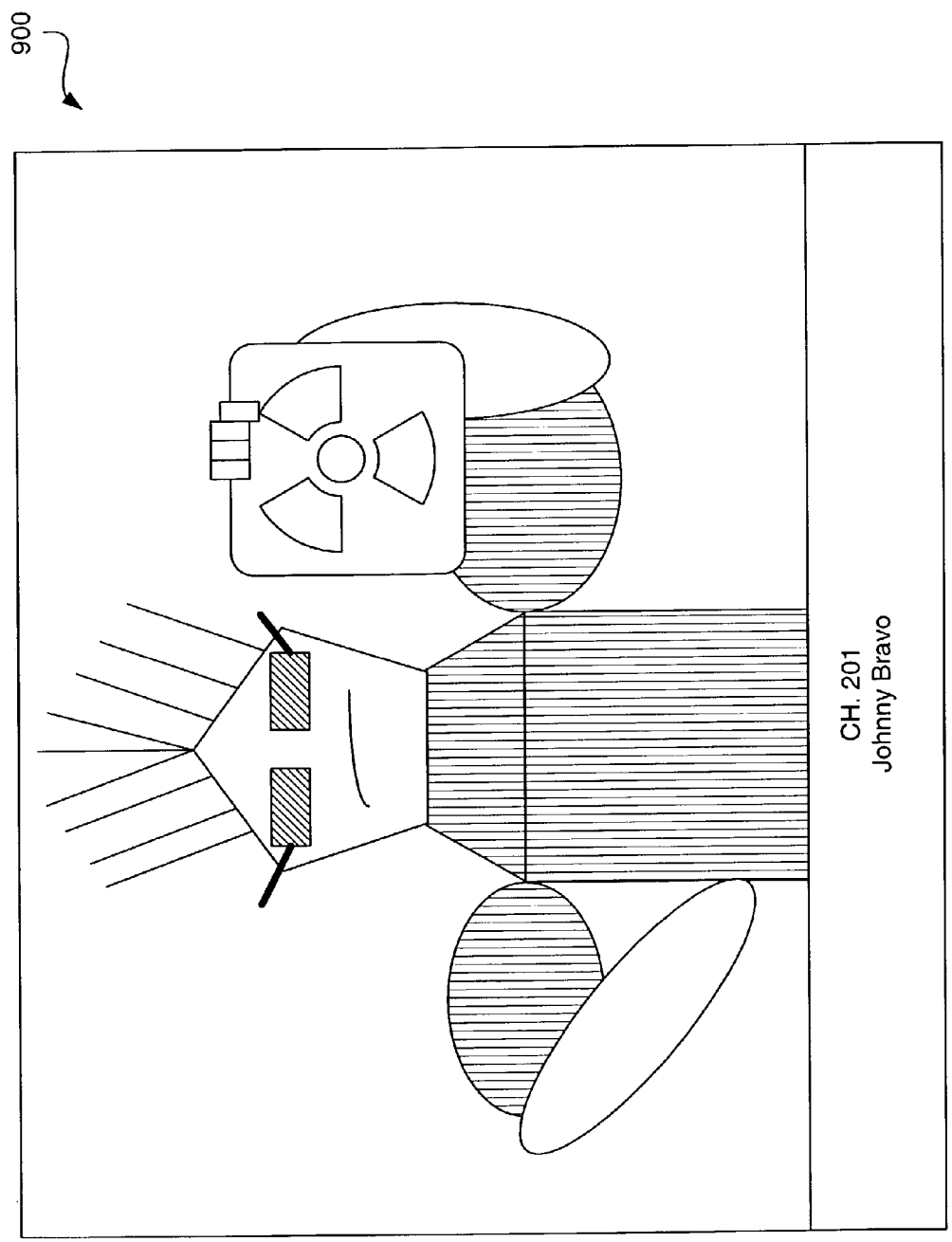

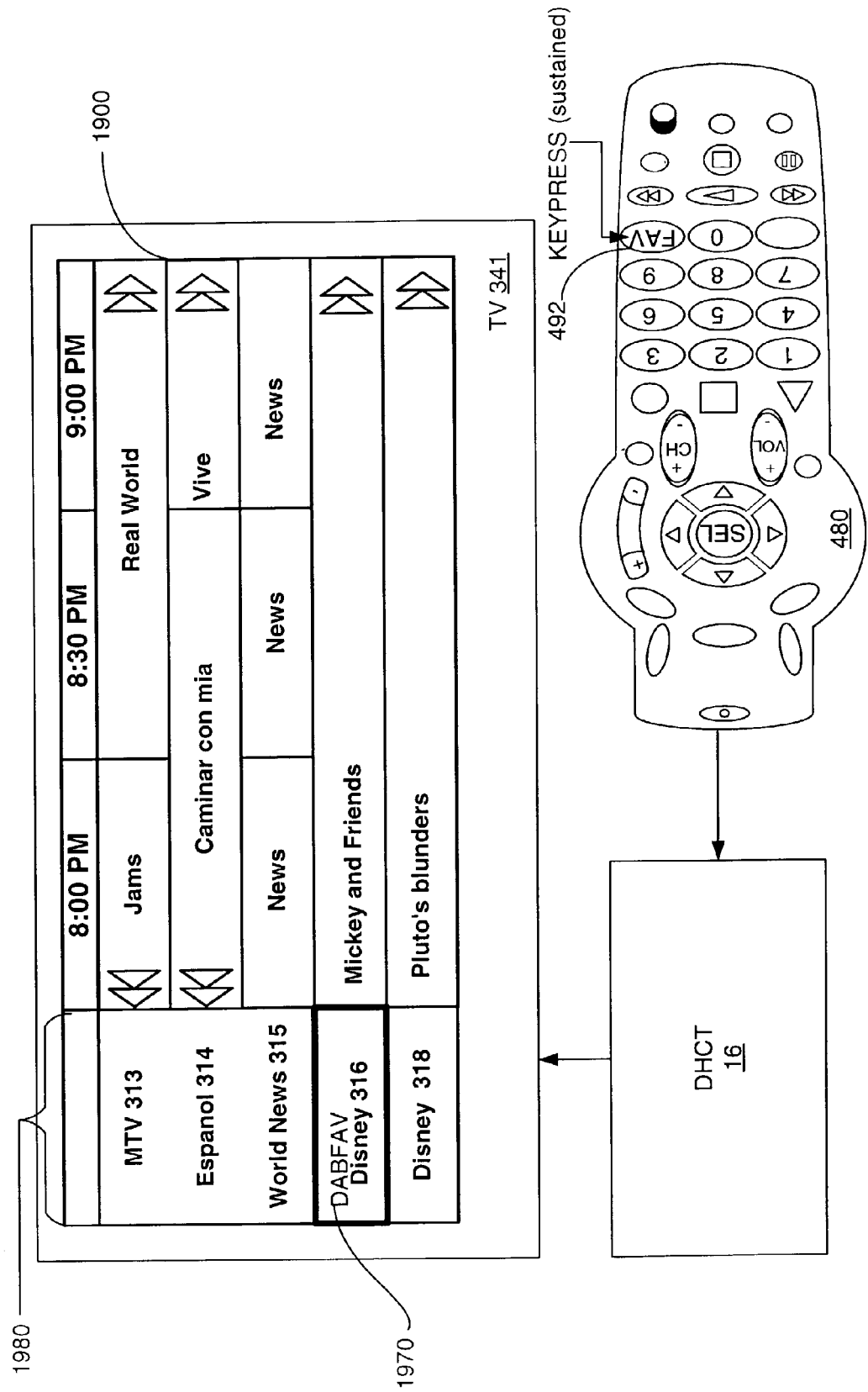

MANAGING FAVORITE CHANNELS

TECHNICAL FIELD

The present invention is generally related to television systems, and, more particularly, is related to interactive television systems.

BACKGROUND OF THE INVENTION

With recent advances in digital transmission technology, subscriber television systems are now capable of providing much more than the traditional analog broadcast video. In implementing enhanced programming, the home communication terminal device ("HCT"), otherwise known as the set-top box, has become an important computing device for accessing media content services (and media content within those services) and navigating a user through a maze of available services. In addition to supporting traditional analog broadcast video functionality, digital HCTs (or "DHCTs") now also support an increasing number of two-way digital services such as video-on-demand and personal video recording.

Typically, a DHCT is connected to a cable or satellite system, or generally, a subscriber television system, and includes hardware and software necessary to provide the functionality of the digital television system at the user's site. Some of the software executed by a DHCT can be downloaded and/or updated via the subscriber television system. Each DHCT also typically includes a processor, communication components, and memory, and is connected to a television set or other display device, such as a personal computer. While many conventional DHCTs are stand-alone devices that are externally connected to a television set, a DHCT and/or its functionality may be integrated into a television set or personal computer or even an audio device such as a programmable radio, as will be appreciated by those of ordinary skill in the art.

DHCTs are typically capable of providing users with a very large number and variety of media content choices. With the large array of choices, subscribers want to be able to quickly and efficiently access their favorite channels. Unfortunately, existing mechanisms for interacting with favorite channels are often cumbersome to access. Thus, a heretofore unaddressed need exists in the industry to address the aforementioned and/or other deficiencies and/or inadequacies.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 9A is a screen diagram of an example media content instance presentation screen from which a user can display favorite channels, in accordance with one embodiment of the invention.

FIGS. 19A-19B are composite diagrams that illustrate a first embodiment for adding a favorite channel to a configured favorite channel category, in accordance with one embodiment of the invention.

DETAILED DESCRIPTION OF THE PREFERRED EMBODIMENTS

The preferred embodiments of the invention now will be described more fully hereinafter with reference to the accompanying drawings. The preferred embodiments of the invention will herein be described in the context of a subscriber television system, with the understanding that other communication systems can similarly benefit, including home entertainment systems, among others. In particular, the preferred embodiments of the invention include systems and methods for commencing a display favorites mode that provides for the display of favorite channels and the ability to scroll among favorite channels. The display favorites mode is recognized by systems of the preferred embodiments as a request to enable certain functionality, such as causing favorites symbols to appear in proximity to favorite channels displayed in an interactive program guide, and/or enabling forward and reverse scrolling among favorite channels displayed in an interactive program guide. The systems and methods of the preferred embodiments also include functionality for adding and deleting favorite channels to or from one or more favorite channel lists that are transparent to the user (i.e., the list is not displayed to the user during the add or delete operations).

Since the preferred embodiments of the invention are described in the context of a subscriber television system, a subscriber television system is described, followed by descriptions of headend and DHCT components of the system. Following the description of these components, a couple of example remote control devices are described, including a detailed schematic of the internal processing of the remote control devices. Implementations of the favorite channels can occur through interactive program guide (IPG) screens and real-time (or time-shifted) presentation screens, and thus the preferred embodiments will be described in the context of these two implementations. Further, examples of configuring favorite channel categories will be described. Finally, some example methods will be described for displaying favorite channels among one or more categories, adding favorite channels, and deleting favorite channels, in accordance with several embodiments of the invention.

The preferred embodiments of the invention may, however, be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and are included as examples among many others contemplated and within the scope of the preferred embodiments of the invention.

Figure 1:
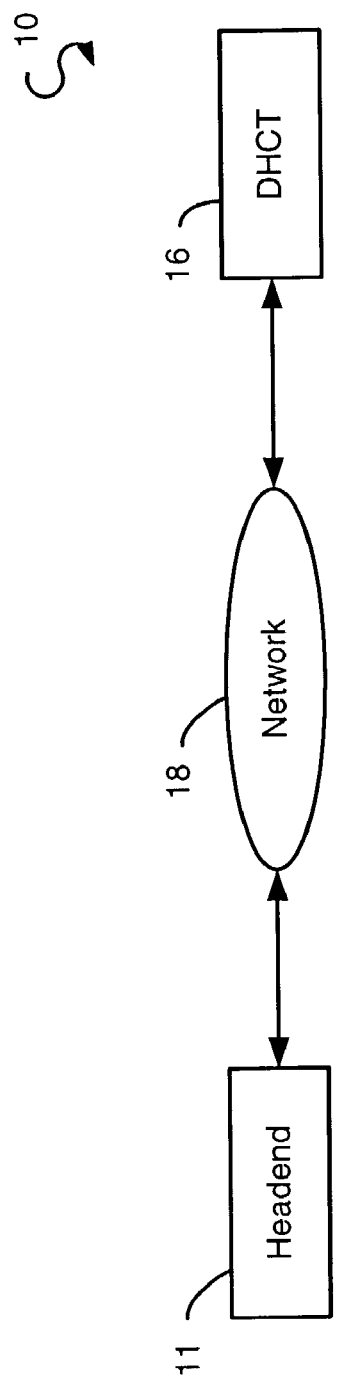
FIG. 1 is a block diagram depicting a non-limiting example of a subscriber television system (STS), in accordance with one embodiment of the invention.

FIG. 1 is a block diagram depicting a non-limiting example of a subscriber television system (STS) 10. In this example, the STS 10 includes a headend 11 and a digital home communication terminal (DHCT) 16 that are coupled via a communications network 18. It will be appreciated that the STS 10 shown in FIG. 1 is merely illustrative and should not be construed as implying any limitations upon the scope of the preferred embodiments of the invention. For example, although single components (e.g., a headend and a DHCT) are illustrated in FIG. 1, the STS 10 can feature a plurality of any one of the illustrated components, or may be configured with alternative embodiments for any one of the individual components or with yet other additional components not enumerated above. Subscriber television systems also included within the scope of the preferred embodiments of the invention include systems not utilizing physical structured cabling for transmission, such as, but not limited to, satellite systems.

A DHCT 16 is typically situated at the residence or place of business of a user and may be a stand-alone unit or integrated into another device such as, for example, a television set or a personal computer or other display devices, or an audio device. The DHCT 16 receives signals (video, audio and/or other data) from the headend 11 through the network 18 and provides any reverse information to the headend 11 through the network 18. In some analog embodiments, a home communication terminal (HCT), not DHCT, is utilized. Also, functionality discussed herein may reside in personal computers, television sets, etc.

The headend 11 receives, among other data and/or media content, program guide data from a program guide provider (not shown). The program guide data comprises information about services that may be provided via the DHCT 16. The headend 11 edits the program guide data and transmits the edited program guide data to the DHCT 16 via the network 18. The headend 11 may include one or more server devices (not shown) for providing video, audio, and/or data to media client devices such as the DHCT 16. The headend 11 and the DHCT 16 cooperate to provide a user with television services via the television set (not shown). The television services may include, for example, broadcast television services, cable television services, premium television services, video-on-demand (VOD) services, and/or pay-per-view (PPV) services, among others.

Figure 2:
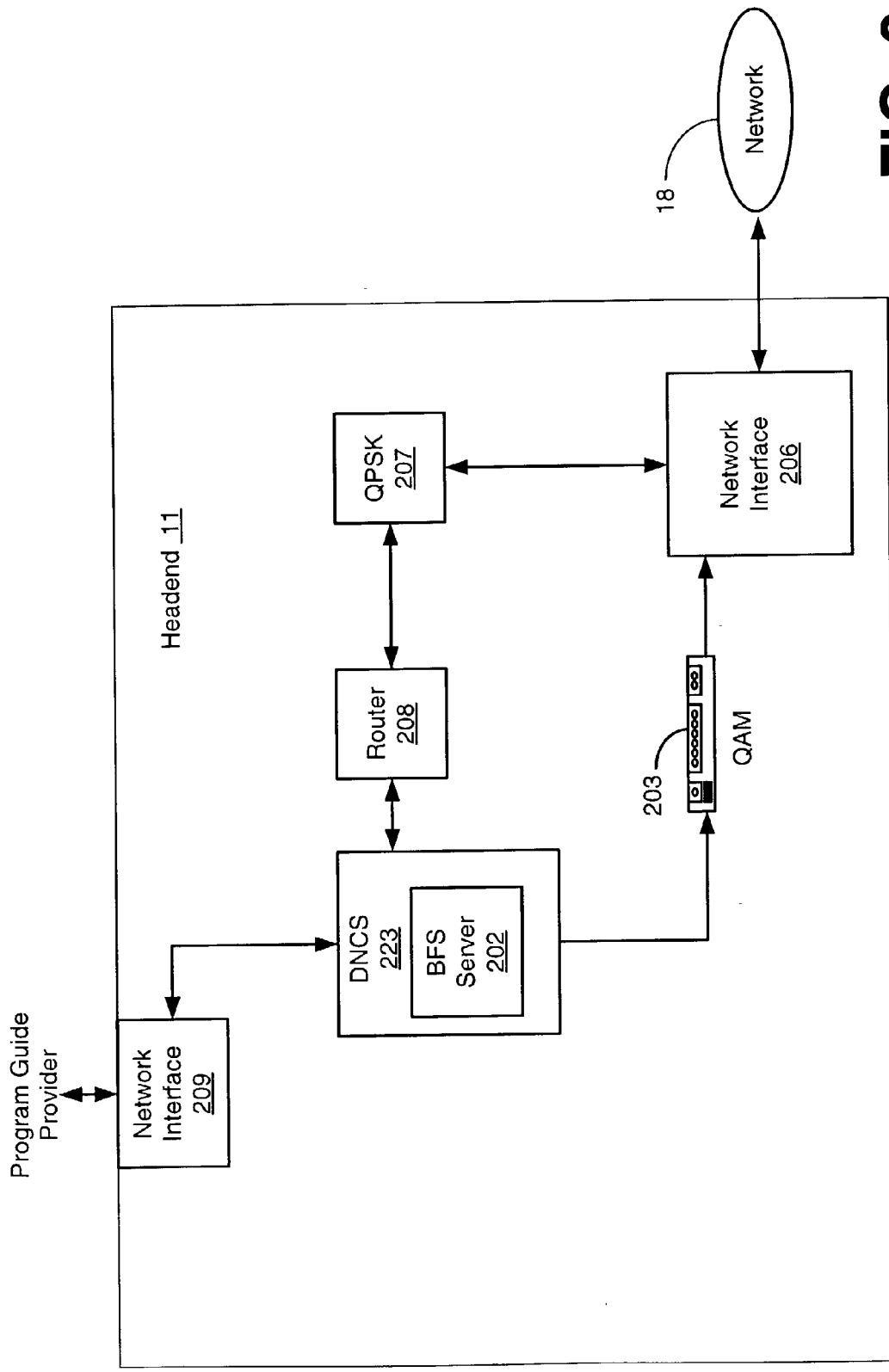
FIG. 2 is a block diagram depicting a non-limiting example of selected components of a headend as depicted in FIG. 1, in accordance with one embodiment of the invention.

FIG. 2 depicts a non-limiting example of selected components of a headend 11 that is configured in accordance with one embodiment of the present invention. It will be understood that the headend 11 shown in FIG. 2 is merely illustrative and should not be construed as implying any limitations upon the scope of the preferred embodiments of the invention. The headend 11 receives media content from a variety of service and content providers (not shown), which can provide input in a variety of ways. The headend 11 combines the media content from the various sources and distributes the media content to subscribers via the distribution systems of the network 18. The input signals may be transmitted from sources to the headend 11 via a variety of transmission paths, including satellites (not shown) and terrestrial broadcast transmitters and antennas (not shown).

A digital network control system (DNCS) 223 provides management, monitoring, and control of network elements and of the broadcast services provided to users. A content provider such as a program guide provider transmits data for television program guides through a network interface 209 to the DNCS 223 of the headend 11, preferably using a file transfer protocol (FTP). The DNCS 223 includes functionality that defines relationships between channel names listed in the program guide data received from the program guide provider and the numbered channels that are available via the DHCT 16. This functionality is used by the DNCS 223 to edit the program guide data to include channel numbers that correspond to the listed channel names. After the program guide data is edited by the DNCS 223, it is transmitted to the DHCT 16 preferably using a broadcast file system (BFS) server 202. The BFS server 202 and its counterpart, a BFS client module 343 (FIG. 3), are part of a file broadcasting system. The BFS server 202 repeatedly sends data through a network interface 206 to the DHCT 16 via a quadrature amplitude modulation (QAM) modem 203 over a period of time in a cyclical manner so that the DHCT 16 may access the data as needed.

A quadrature phase shift keying (QPSK) modem 207 is responsible for transporting out-of-band IP (internet protocol) datagram traffic between the distribution headend 11 and a DHCT 16. Data transmitted or received by the QPSK modem 207 may be routed by a headend router 208. The headend router 208 may be used to deliver upstream data to various server applications (not shown).

Figure 3:
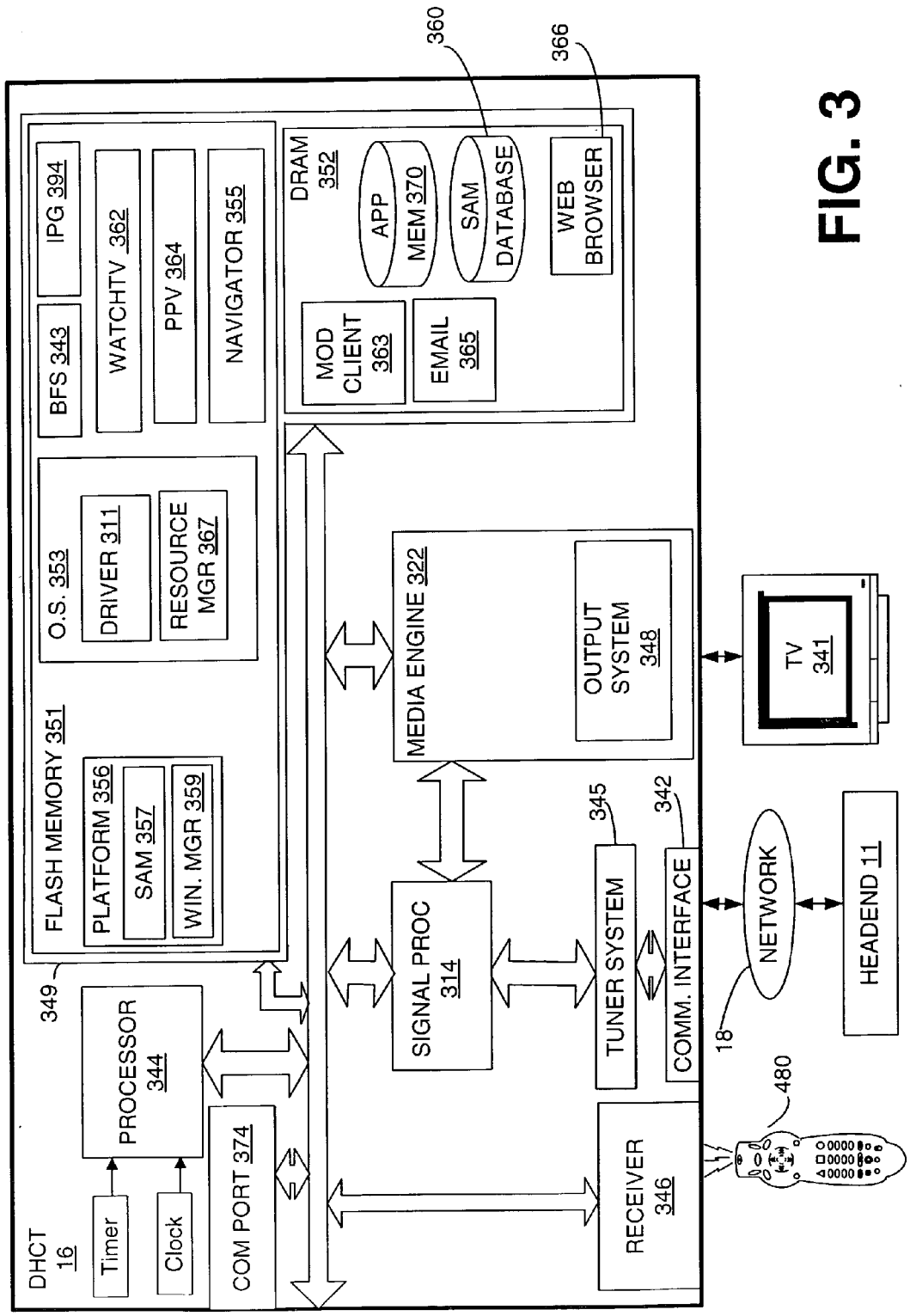
FIG. 3 is a block diagram illustration of an example digital home communication terminal (DHCT) as depicted in FIG. 1, which is coupled to a headend and to a television set, in accordance with one embodiment of the invention.

FIG. 3 is a block diagram illustration of an example DHCT 16 that is coupled to a headend 11 and to a television set 341, in accordance with one embodiment of the invention. It will be understood that the DHCT 16 shown in FIG. 3 is merely illustrative and should not be construed as implying any limitations upon the scope of the preferred embodiments of the invention. For example, some of the functionality performed by applications executed in the DHCT 16 (such as an MOD application 363) may instead be performed completely or in part at the headend 11 and vice versa, or not at all in some embodiments. The DHCT 16 preferably includes a communications interface 342 for receiving signals (video, audio and/or other data) from the headend 11 through the network 18, and provides reverse information to the headend 11 through the network 18.

The DHCT 16 preferably includes one or more processors, such as processor 344 (e.g., a central processing unit or digital signal processor), for controlling operations of the DHCT 16, an output system 348 for driving the television set display, and at least one tuner system 345 for tuning into a particular television channel or frequency to display media content and for sending and receiving various types of data or media content to and from the headend 11. The DHCT 16 may include, in other embodiments, multiple tuners for receiving downloaded (or transmitted) media content. The tuner system 345 enables the DHCT 16 to tune to downstream media and data transmissions, thereby allowing a user to receive digital and/or analog media content delivered in the downstream transmission via the subscriber television system. The tuner system 345 includes, in one implementation, an out-of-band tuner for bi-directional QPSK data communication and one or more QAM tuners (in band) for receiving television signals. Additionally, a receiver 346 receives externally generated information, such as user inputs or commands from an input device, such as remote control device 480, or other devices.

The DHCT 16 processes analog and/or digital transmission signals for storage in a storage device such as an optical or hard disk drive (not shown), and/or for display to the television set 341. The DHCT 16 preferably includes a signal processing system 314 and a media engine 322. The components of the signal processing system 314 are capable of QAM demodulation, forward error correction, and demultiplexing of MPEG-2 transport streams, and parsing of elementary streams and packetized elementary streams. Additional components, not shown, include an analog decoder and compression engine for processing an analog transmission signal and, in one implementation, converting it to compressed audio and video streams that are produced in accordance with the syntax and semantics of a designated audio and video coding method, such as specified by the MPEG-2 audio and MPEG-2 video ISO (International Organization for Standardization or ISO) standard.

The signal processing system 314 outputs packetized compressed streams and presents them as input for storage in the storage device, or in other implementations, as input to the media engine 322 for decompression by a video decompression engine (not shown) and an audio decompression engine (not shown) for display on the TV set 341. One having ordinary skill in the art will appreciate that the signal processing system 314 will preferably include other components not shown, including memory, decryptors, samplers, digitizers (e.g., analog-to-digital converters), and multiplexers, among other components. Further, it will be understood that one or more of the components listed above will interface with the processor 344 and/or system memory 349 (and/or dedicated memory for a particular component) to facilitate data transfer and/or processing of the video and/or audio signal for display and/or storage.

One or more programmed software applications are executed by utilizing the computing resources in the DHCT 16. Note that an application typically includes a client part and a server counterpart that cooperate to provide the complete functionality of the application. The applications may be resident in FLASH memory 351 or downloaded (or uploaded) into DRAM 352. Applications stored in FLASH memory 351 or DRAM 352 are executed by the processor 344 under the auspices of the operating system 353. Data required as input by an application is stored in DRAM 352 or FLASH memory 351 and read by the processor 344 as need be during the course of application execution. Input data may be data stored in DRAM 352 by a secondary application or other source, either internal or external to the DHCT 16, or possibly anticipated by the application and thus created with the application at the time it was generated as a software application, in which case it is preferably stored in FLASH memory 351. Data generated by an application is stored in DRAM 352 by the processor 344 during the course of application execution. DRAM 352 also includes application memory 370 that various applications may use for storing and/or retrieving data.

An application referred to as a navigator 355 is also resident in FLASH memory 351 for providing a navigation framework for services provided by the DHCT 16. The navigator 355 registers for and in some cases reserves certain user inputs related to navigational keys such as channel increment/decrement, last channel, favorite channel, etc. For example, the navigator 355 preferably includes a data structure (i.e., structured data such as a database or data structure) comprising one or more lists of favorite channels (a favorites list or favorite channel list) among one or more favorite channel categories (favorites categories). This list can be accessed, added to, and deleted from in a manner that is transparent to the user (the favorite channel list is not displayed) according to several mechanisms described below. In the preferred embodiments of the invention, additions to and deletions from the favorite channel list, in addition to displays of favorites, will preferably be implemented while the user is viewing one or more presentation screens, such as an IPG screen or a media content instance presentation screen (e.g., a display screen presented while watching a TV episode or live broadcast), thus enabling continued viewing of these screens while transparently accessing and/or editing favorite channel lists. The navigator 355 also provides users with television related menu options that correspond to DHCT functions such as, for example, blocking a channel or a group of channels from being displayed in a channel menu presented on a screen display.

The FLASH memory 351 also contains a platform library 356. The platform library 356 is a collection of utilities useful to applications, such as a timer manager, a compression manager, a configuration manager, a hyper text markup language (HTML) parser, a database manager, a widget toolkit, a string manager, and other utilities (not shown). These utilities are accessed by applications via application programming interfaces (APIs) as necessary so that each application does not have to contain these utilities. Two components of the platform library 356 that are shown in FIG. 3 are a window manager 359 and a service application manager (SAM) client 357.

The window manager 359 includes a mechanism for implementing the sharing of the screen regions and user input. The window manager 359 on the DHCT 16 is responsible for, as directed by one or more applications, implementing the creation, display, and de-allocation of the limited DHCT 16 screen resources. It allows multiple applications to share the screen by assigning ownership of screen regions, or windows. The window manager 359 communicates with the resource manager 367 to coordinate available resources (such as display memory) among different resource consuming processes. Such processes may be directly or indirectly invoked by one or more applications.

The SAM client 357 is a client component of a client-server pair of components, with the server component (not shown) being located on the headend 11, preferably in the DNCS 223 (FIG. 2). A SAM database 360 (i.e., structured data such as a database or data structure) in DRAM 352 includes a data structure of services and a data structure of channels that are created and updated by the headend 11. Herein, database will refer to a database, structured data or other data structures as is well known to those of ordinary skill in the art. Applications can also be downloaded into DRAM 352 at the request of the SAM client 357, typically in response to a request by the user or in response to a message from the headend 11. In the example DHCT 16 illustrated in FIG. 3, DRAM 352 includes a media-on-demand (MOD) application 363, an e-mail application 365, and a web browser application 366. Example applications resident in FLASH memory 351 include, by way of non-limiting example, an IPG application 394, a WatchTV application 362, a BFS application 343, and a Pay Per View (PPV) application 364. It should be clear to one with ordinary skill in the art that these applications are not limiting and merely serve as examples for embodiments of the invention. Furthermore, one or more DRAM based applications may be resident, as an alternative embodiment, in FLASH memory 351. These applications, and others provided by the subscriber television system operator, are top-level software entities on the network for providing services to the user.

An executable program or algorithm corresponding to an operating system (OS) component, or to a client platform component, or to an application, or to respective parts thereof, can reside in and execute out of DRAM 352 and/or FLASH memory 351. Likewise, data input into or output from any executable program can reside in DRAM 352 or FLASH memory 351. Furthermore, an executable program or algorithm corresponding to an operating system component, or to a client platform component, or to an application, or to respective parts thereof, can reside in FLASH memory 351, or in a local storage device externally connected to or integrated into the DHCT 16 and be transferred into DRAM 352 for execution. Likewise, data input for an executable program can reside in FLASH memory 351 or a storage device and be transferred into DRAM 352 for use by an executable program or algorithm. In addition, data output by an executable program can be written into DRAM 352 by an executable program or algorithm and be transferred into FLASH memory 351 or into a storage device. In other embodiments, the executable code is not transferred, but instead, functionality is effected by other mechanisms.

The DHCT 16 can also include one or more wireless or wired interfaces, also called communication ports 374, for receiving and/or transmitting data to other devices. For instance, the DHCT 16 may feature USB (Universal Serial Bus), Ethernet (for connection to a computer), IEEE-1394 (for connection to media content devices in an entertainment center), serial, and/or parallel ports. The user inputs may be, for example, provided by an input device including a computer or transmitter with buttons or keys located either on the exterior of the terminal or by a hand-held remote control device 480 or keyboard that includes user-actuated buttons, or even aural input (e.g., voice activated), among others.

The IPG application 394 displays a program guide to the user and populates the guide with information about television services. The IPG application 394 utilizes the window manager 359 and other graphics utilities provided by the operating system 353 to render an IPG on the television set 341. The window manager 359 is a component that, in one embodiment, is part of the platform 356, but in other embodiments may be part of the operating system 353. The window manager 359 contains functionality for allocating screen areas and managing screen use among multiple applications. The operating system 353 provides primitives to the IPG application 394 in order to help render images on the television set 341. As a window is generated on a display device, the IPG application 394 registers with the window manager 359 for particular user input commands that may be required for selecting options provided by a newly-created window.

Figure 4:
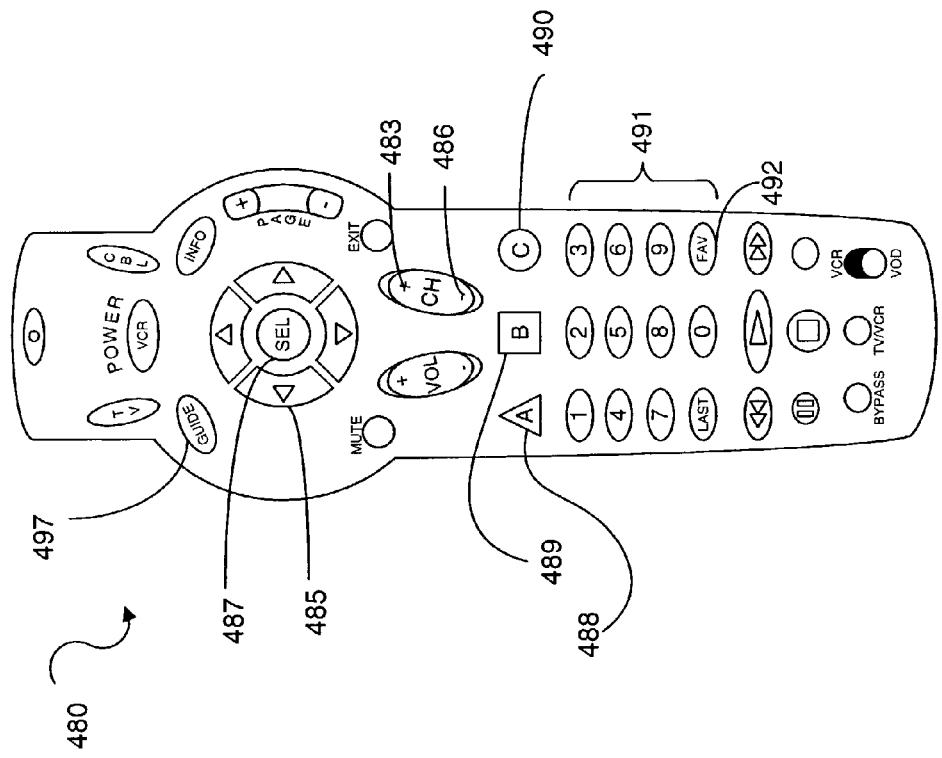
FIG. 4 is a schematic diagram of one example remote control device to provide input to the DHCT illustrated in FIG. 3, in accordance with one embodiment of the invention.

An example remote control device 480 to provide input to the DHCT 16 (FIG. 3) is illustrated in FIG. 4. The example remote control device 480 includes a select button 487 for making selections on a screen display, navigation buttons 485 for navigating within a particular screen display or during a display favorites mode, a channel up button 483 for scrolling among favorite channels in ascending channel number order, and a channel down button 486 to scroll among favorite channels in descending channel number order, in accordance with one embodiment of the invention. The example remote control device 480 also includes alphanumeric buttons 491 for entering display channel numbers, or favorite channel category numbers, or inputting letters for keyword searches or special configuration screens, among other functions. A favorites button 492 enables a user to display favorite channels in an IPG screen or to display media content instance presentation screens associated with a favorites channel, and is used in the addition or deletion of favorite channels from a favorite channel list while being presented with the IPG screen or a media content instance, in accordance with one embodiment of the invention. "A" 488, "B" 489, and "C" 490 buttons can correspond to certain application-defined functions that have a corresponding "A", "B", or "C" symbol displayed in a graphic user interface (GUI) presented on a display device. The guide button 497 may be used to access a television program guide such as, for example, an IPG screen. Many alternative methods of providing user input may be used including a remote control device with different buttons and/or button layouts, a keyboard device, a voice activated device, etc. The embodiments of the invention described herein are not limited by the type of device used to provide user input.

Figure 5:
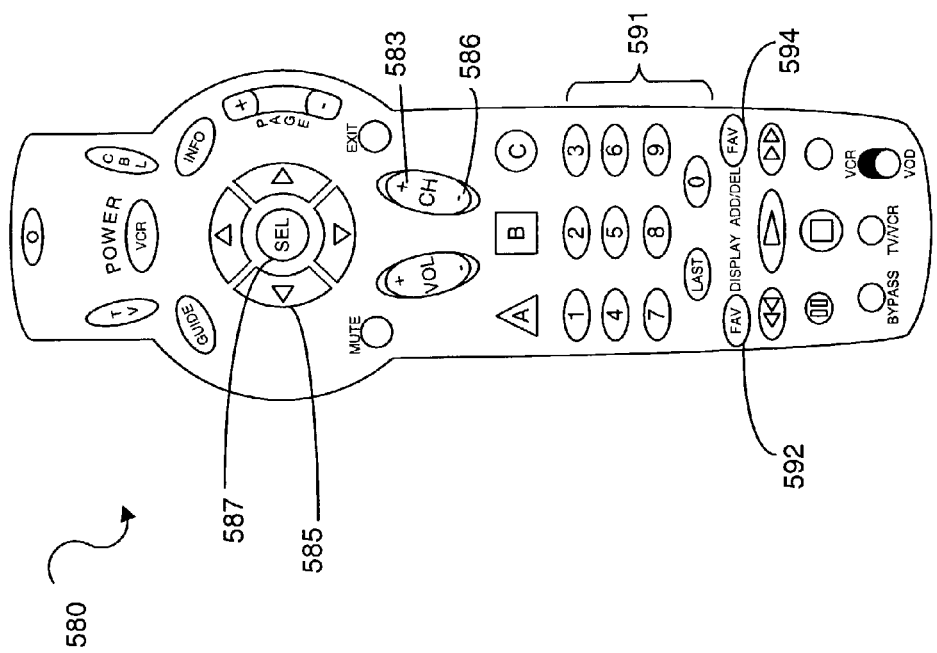
FIG. 5 is a schematic diagram of one example remote control device to provide input to the DHCT illustrated in FIG. 3, in accordance with one embodiment of the invention.

FIG. 5 is a schematic diagram of another example remote control device 580 somewhat similar to the example remote control device 480 of FIG. 4, but with the favorite channel functionality included among two buttons. Thus, the example remote control device 580 includes a select button 587, a channel up button 583, a channel down button 586, and alphanumeric buttons 591, among others. An add-delete favorites button 594 is used to add and delete favorite channels in a favorite channel list while the targeted favorite channel (or potential favorite channel) is displayed in an IPG or presentation screen display. The display favorites button 592 is used to display favorite channels in an IPG screen or to display a media content instance presentation screen of a favorite channel. The remote control device 480 (FIG. 4) will be used for purposes of discussion, with the understanding that similarly labeled buttons on the remote control device 580 perform a similar function. The remote control device 580 will be used in the following discussions where necessary to exploit differences in functionality.

Figure 6:
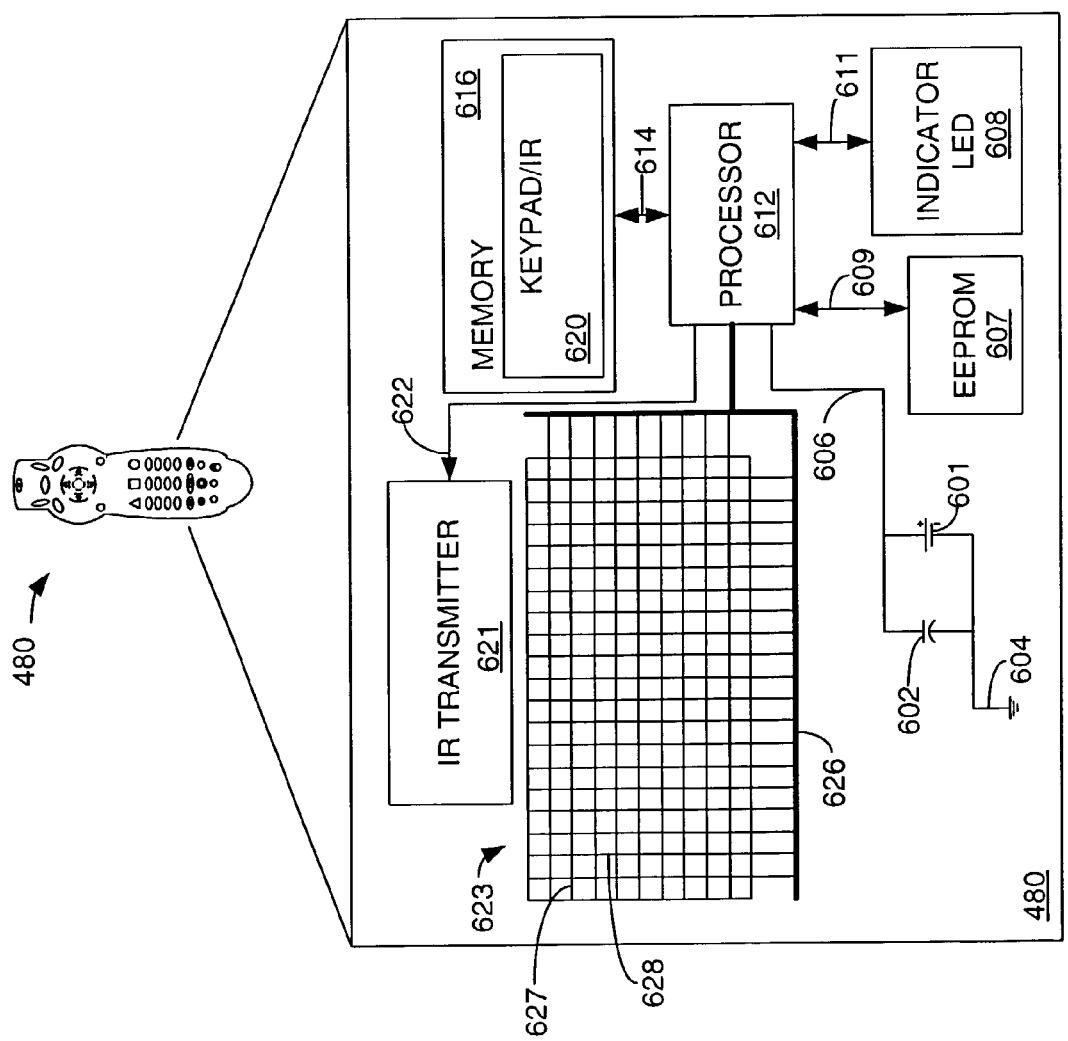
FIG. 6 is a schematic diagram depicting a non-limiting example of select components of the example remote control devices illustrated in FIGS. 4 and 5, in accordance with one embodiment of the invention.

FIG. 6 is a schematic diagram of selected elements of the example remote control device 480 of FIG. 4 and remote control device 580 of FIG. 5 with, for example, infrared (IR) communication capabilities. Although the description below is applicable to both remote control devices, for simplicity, the below description will be used in the context of the remote control device 480. Although an example remote control device 480 with IR functionality is shown, it will be understood that other forms of communication functionality are within the scope of the present invention, including but not limited to audio communication. The remote control device 480 includes a keypad matrix 623, which includes horizontal lines, an exemplary one of which is indicated by reference numeral 627, and vertical lines, an exemplary one of which is illustrated by reference numeral 628. Typically, buttons on the remote control 480 are located at the intersection of horizontal lines 627 and vertical lines 628. When actuated, i.e., pressed, the button associated with the intersection of horizontal lines 627 and vertical lines 628 within the keypad matrix 623 causes an electrical connection to be made at the intersecting lines. In this manner, when a button on the remote control device 480 is pressed, a circuit is completed at the particular intersection of vertical and horizontal lines corresponding to the pressed button and a signal is sent via a communication bus 626 to a processor 612. The processor 612 analyzes the received signal and, depending upon which horizontal line and which vertical line are indicated by the button press, determines which function or key has been pressed.

The remote control device 480 also includes a power source 601, which is typically a replaceable battery, and a bypass capacitor 602. The power source 601 and the bypass capacitor 602 are grounded at location 604 and communicate via connection 606 with the processor 612. The processor 612 is also connected via connection 611 to an indicator light emitting diode (LED) 608. The indicator LED 608 indicates when an IR signal is being transmitted and also functions as a low battery indicator.

The processor 612 is also connected via connection 609 to electrically erasable programmable read only memory (EEPROM) 607. EEPROM 607 includes the remote control device functions in a non-volatile memory arrangement so that when the battery in the remote control device 480 is replaced, the remote control device 480 does not lose its memory. The processor 612 communicates via connection 614 with memory 616. Memory 616 is typically a random access memory (RAM) that includes a keypad IR module 620. When the processor 612 detects a keypress from the keypad matrix 623, the processor 612 accesses memory 616 and the keypad IR module 620 to determine which IR code corresponds to the detected keypress. Once the processor 612 determines the correct IR code based on the detected keypress, the processor 612 communicates with an IR transmitter 621 via connection 622 to emit an appropriate IR signal that includes the appropriate key code to an IR receiver.

With reference to FIGS. 3 and 4, and continued reference to FIG. 6, the remote control device 480 transmits an IR signal, which is received in the DHCT 16 by the receiver 346. Although illustrated as being transmitted to the DHCT 16, the IR signal transmitted by the remote control device 480 can be received by any communication box such as the DHCT 16, directly by the television set 341, or other peripheral devices. The receiver 346 demodulates the received IR signal, and preferably stores it in a temporary memory, preferably a first-in-first-out (FIFO) memory residing in the receiver 346, and then notifies the processor 344. The notification may be effected by an interrupt generated directly or indirectly by the receiver 346 or by the processor 344 polling the status of registers in the receiver 346 on a regular or periodic basis.

The driver 311 that is preferably part of the operating system 353 executes on the processor 344 to attend keypresses and releases from the remote control device 480, and fulfills the aforementioned functionality in communication with the receiver 346. A sequence of one or more demodulated IR signals corresponding to keypresses and/or releases are transferred to memory 349. Each keypress or release is converted by the operating system 353 in cooperation with the driver 311 to a keypress indication that the modules of the operating system 353, including the window manager 359 and other applications, understand. In an alternate embodiment, the receiver 346 performs the conversion to keypress indications prior to storing in its temporary FIFO memory. After the IR code has been stored (and converted to a keypress indication), the window manager 359 causes the processor 344 to generate an interrupt, which informs the navigator 355 that an IR keypress signal has been received as explained above. The navigator 355 then retrieves the register value from memory 349 and performs the required action corresponding to the received IR keypress signal. Furthermore, because an IR protocol typically implements transmission and reception of continuous IR codes spaced at certain time intervals, for example 37 milliseconds apart, the processor 344 has the capability to determine keypresses signals and key releases as well as continuous down keypresses and delays in successive keypress signals. For example, as is described below, a user will preferably select a favorite channel category (for example, by number) after selecting the desired favorite channel if more than one category exists. Failure to receive the category number (via a keypress) after a defined period (e.g., 2 seconds) may prompt a screen asking the user to help the navigator 355 (FIG. 3) discern which category the user desires (or in other embodiments, a default category will be provided).

So as long as the same key is pressed, the key signal is passing the same key word (or IR code) to the navigator 355 which in turn can make sense of the desired functionality. A dual keypress can be interpreted as a one key word. The navigator 355, as indicated above, can detect a sustained keypress. For example, to add (or delete) a favorite channel, the user can press the favorites button 492 for a sustained duration (e.g., 3 seconds) when highlighting a particular display channel. The navigator 355 recognizes the associated keypress indication as an instruction to provide functionality for adding a favorite channel to a favorite channel list. In contrast, when the favorites button 492 is pressed momentarily (i.e., for less than a sustained duration, e.g. approximately 1 second), the navigator 355 recognizes the associated keypress indication as a request to commence a display favorites mode, and thus the display will advance to the next higher numbered display channel that is a favorite channel. Thus, one trigger for discerning the required functionality for pressing the same button (e.g., the favorites button 492) is the timing of the keypress release, through the cooperation of the navigator 355 with timing mechanisms of the DHCT 16.

With reference to FIG. 3, and as with other user interface screen display examples discussed below, the processor 344 executes program instructions of the active application that cause it to employ the services of the window manager 359 to create a graphics user interface (GUI) screen display via display data that is formatted for the television set 341. The processor 344 stores the display data or parts thereof in DRAM 352 (as necessary) and transfers the display data to a display output system such as output system 348 wherein display data is converted to respective television signals and transmitted to the television set 341. Of course, the scope of the preferred embodiments of the present invention also includes any other method of causing the described user interface screen displays to appear to the user.

Figure 7:
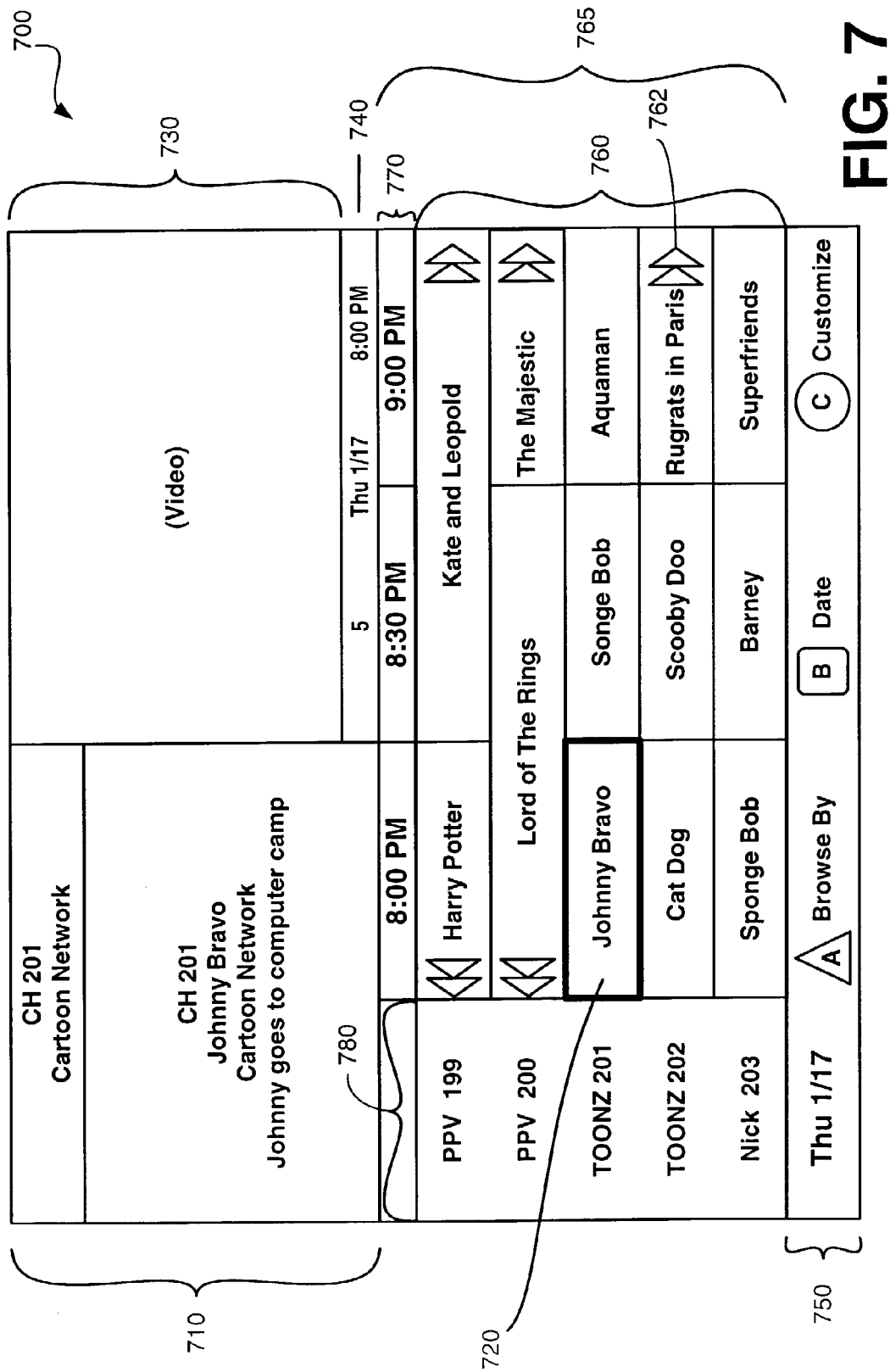
FIG. 7 is a screen diagram of an example interactive program guide (IPG) screen from which the user can display and add or remove favorite channels, in accordance with one embodiment of the invention.

FIG. 7 depicts an example IPG screen 700 that illustrates an initial program guide arrangement in a time format. Other browse-by formats can be presented to the user, including browse-by theme, as one example. The example IPG screen 700 can be presented by the IPG application 394 (FIG. 3) in response to a user activating the guide key 491 (FIG. 4), as one example. The IPG application 394 works in cooperation with the window manager 359 (FIG. 3) to present a user with IPG screens that are formatted in accordance with IPG configuration data that is stored in a configuration database (not shown). Furthermore, the IPG application 394 can retrieve media content instance listing information from an IPG database (not shown) as needed for presentation via an IPG screen. The databases can be located within the DHCT 16, or remotely.

The top left portion of the IPG screen 700 includes a detailed focus area 710 that includes detailed information for a currently highlighted media content instance listing or display channel. Video corresponding to the television service to which the DHCT 16 (FIG. 3) is currently tuned (for which audio may also be playing, and which preferably corresponds to a television presentation occupying the full screen before the user is presented with the IPG screen 700) is displayed in a video area 730. Immediately below the video area 730 is an information banner 740 for displaying the television display channel number corresponding to the service to which the DHCT 16 is currently tuned (e.g., display channel 5), the current day and date (e.g., Thursday, January 17), and the current time (e.g., 8:00 p.m.).

An IPG grid 765 includes a listing display area 760, a time area 770, and a display channel area 780. The listing display area 760 contains listings of media content instances that correspond to respective television services identified in the display channel area 780 that are scheduled to be available during the time periods listed in the time area 770. The listings, such as the Johnny Bravo listing 720, includes an identifier such as the title of the media content instance (e.g., Johnny Bravo) it represents, and can include other identifiers like parental control icons or differences in shading and/or color to represent different functionality. The display channel area 780 includes, in one implementation, a vertical list of television services organized sequentially from top to bottom by increasing television display channel number (except for the highest numbered television service which is typically listed immediately above the lowest numbered television service).

In this non-limiting example, the left-most time column (i.e., under the 8:00 time slot) in the listing display area 760 includes the title of a media content instance listing (the highlighted Johnny Bravo listing 720), which is scheduled to be provided via the Cartoon Network (i.e., Toonz on display channel number 201). The bottom area 750 of the IPG screen 700 indicates the selected day for which media content instance listing data is being displayed as well as information about the current functions of the "A", "B", and "C" buttons (488-490, FIG. 4) on the remote control device 480 (FIG. 4).

In an alternative embodiment, the IPG screen 700 may have fewer, additional, and/or different components and may have a different layout. For example, the IPG screen 700 might not include one or more of a detailed focus area 710, a video area 730, an information banner 740, and/or a bottom area 750. The double arrow icons 762 indicate that a given media content instance corresponding to that listing has a duration that expands beyond the time period shown in the current IPG display screen, suggesting to the user that the balance of the listing can be viewed in another IPG display screen by selecting the right (in this example) or left navigation arrow buttons 485 on the remote control device 480 (FIG. 4), depending on the direction of the double arrow icon 762. Note that the functions of highlighting, scrolling, and other navigation functions for interacting with a particular screen involve selecting buttons on the remote control device 480 that often correspond to user-suggestive symbols displayed on the screen. It will be understood that terminology that describes making selections on a particular screen will be understood to include making the corresponding selections using a remote control device 480. Other input devices contemplated to be within the scope of the preferred embodiments of the invention include a touch screen, a mouse, and an IR keyboard, among others. For the sake of simplicity in discussion, the IPG screens will be illustrated in the following figures with an IPG grid and display channel area only (e.g., the IPG grid 765 and the display channel area 780).

Figure 8:
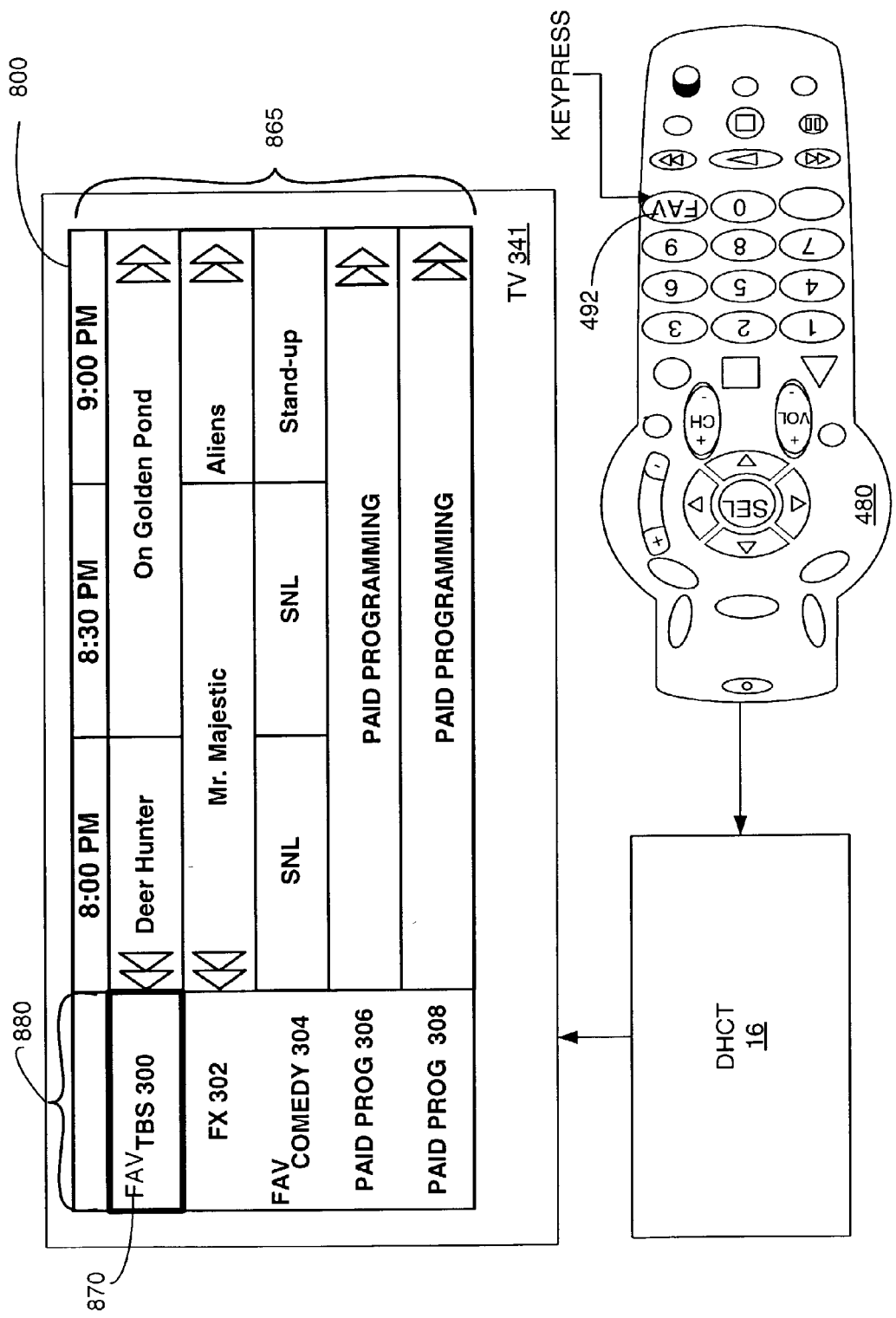
FIG. 8 is a composite diagram that illustrates how a user can display favorite channels from an IPG screen, in accordance with one embodiment of the invention.

FIG. 8 is a composite diagram that illustrates how a user can cause the display of favorite channels from an IPG screen 800, in accordance with one embodiment of the invention. FIG. 8 includes a TV set 341, an IPG screen 800 that includes an IPG grid 865 and the display channel area 880, a DHCT 16 coupled to the TV set 341, and a remote control device 480 for providing input to the DHCT 16. Although the DHCT 16 is shown as separate from the TV set 341, in other embodiments, DHCT functionality can be integrated into the TV set 341. With reference to the IPG screen 700 of FIG. 7, assume that while the user had highlighted the Johnny Bravo listing 720 (FIG. 7), he or she decided to review what favorite channels were currently available. As shown in FIG. 8, the user selects (represented in the figures herein as the word, "keypress") the favorites button 492 momentarily (e.g., less than a sustained duration) on the remote control device 480, which responsively generates a signal that is received at the DHCT 16 and, after processing as described above, is recognized as a request to commence the display favorites mode. The DHCT 16, through the mechanisms of the navigator 355 as described above, displays one or more favorite channels. Display of a favorite channel herein includes highlighting the favorite channel in an IPG screen, advancing (e.g., tuning to) to a display channel that includes a presentation of a media content instance that is included in a favorite channel list, and/or presenting a favorites symbol, as is described below. In other embodiments, a favorites symbol can be omitted. Preferably, when the current screen is an IPG screen, the first displayed favorite channel upon entering the display favorites mode can be the favorite channel subsequent in display channel number order to the display channel from which the user had launched the request. In other embodiments, the favorite channel that is displayed can be the first channel number (beginning from channel 0) that is a favorite channel. Still other embodiments can include systems that display a lower number channel that is a favorite channel in response to commencing a display favorites mode.

In FIG. 7, it was assumed the user was highlighting the Johnny Bravo listing 720 on the TOONZ channel, Ch. 201. Assume the following favorite channels were previously selected, and only one category (a default category) of favorite channels (as explained below) is configured: TBS on Ch. 300, ABC on Ch. 7, and Comedy Central on Ch. 304. Responsive to selecting (using an un-sustained keypress) the favorites button 492, the display favorites mode commences, and the TBS channel 300 is displayed (e.g., highlighted), since the next (in advancing chronological channel number order) favorite channel number after the highlighted listing 720 (associated with channel number 201) (FIG. 7) is TBS on channel 300. Also, a favorites (FAV) symbol 870 (herein, FAV symbol), signifying that the highlighted favorite channel is indeed a favorite channel, is included in the highlighted area of the display channel area 880 in proximity to the identity of the favorite channel (e.g., TBS 300). Although shown with a FAV symbol 870 to signify a favorite channel, it will be understood by those of ordinary skill in the art that other symbols can be used, or other feedback mechanisms (e.g., background color changes, etc.). When the user seeks to exit from the display favorites mode, he or she selects the favorites button 492 momentarily (un-sustained), and the FAV symbol 870 disappears and the user is left on display channel 300 in the IPG screen. In other embodiments, the user can be returned to the display channel number from which he or she commenced the display favorites mode (e.g., display channel 201).

Figure 9B:
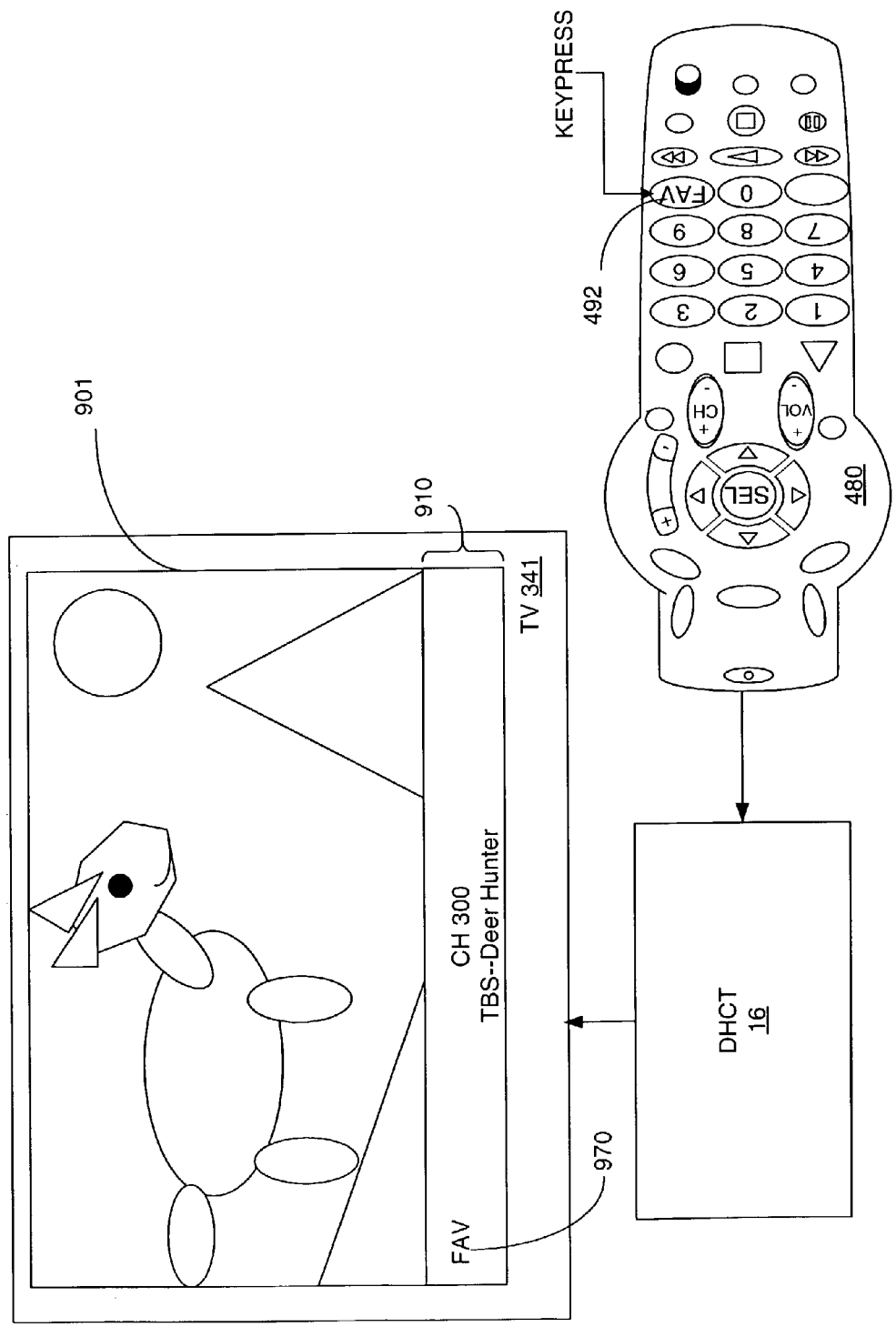
FIG. 9B is a composite diagram that illustrates how a user can display favorite channels from a media content instance presentation screen, in accordance with one embodiment of the invention.

A similar mechanism for displaying the current favorite channels can be employed while watching a broadcast (or on-demand) presentation, as illustrated in FIGS. 9A-9B. FIG. 9A is a screen diagram of an example presentation screen 900 of Johnny Bravo before pressing the favorites button 492 (FIG. 4). As shown in FIG. 9B, the user selects the favorites button 492 momentarily (un-sustained) on the remote control device 480, and in response, the display favorites mode commences, and a presentation screen 901 of a media content instance (e.g., Deer Hunter) on TBS is displayed along with a FAV symbol 970 in the channel banner 910 to signify that this is a favorite channel. Note that TBS (display channel 300) is the next highest ordered display channel after Toonz (Channel 201) that is a favorite channel. Further examples described below will use the IPG screen implementation, with the understanding that the preferred embodiments can be employed similarly when the user is in a presentation screen. When the user seeks to exit from the favorites display mode, he or she selects the favorites button 492 momentarily (un-sustained), and the FAV symbol 970 disappears and the user remains viewing the current screen 901 (or in other embodiments, the screen returns to display channel 201 from which the display favorites mode was launched).

In implementations using remote control device 580 (FIG. 5), similar mechanisms to those described for FIGS. 8-9 are employed. To display the favorite channels while viewing listings in an IPG or while viewing a media content instance presentation in a presentation screen, the user commences a display favorites mode by selecting the display favorites button 592 (FIG. 5). To discontinue the display favorites mode, the user selects the display favorites button 592 again.

Figure 10A:
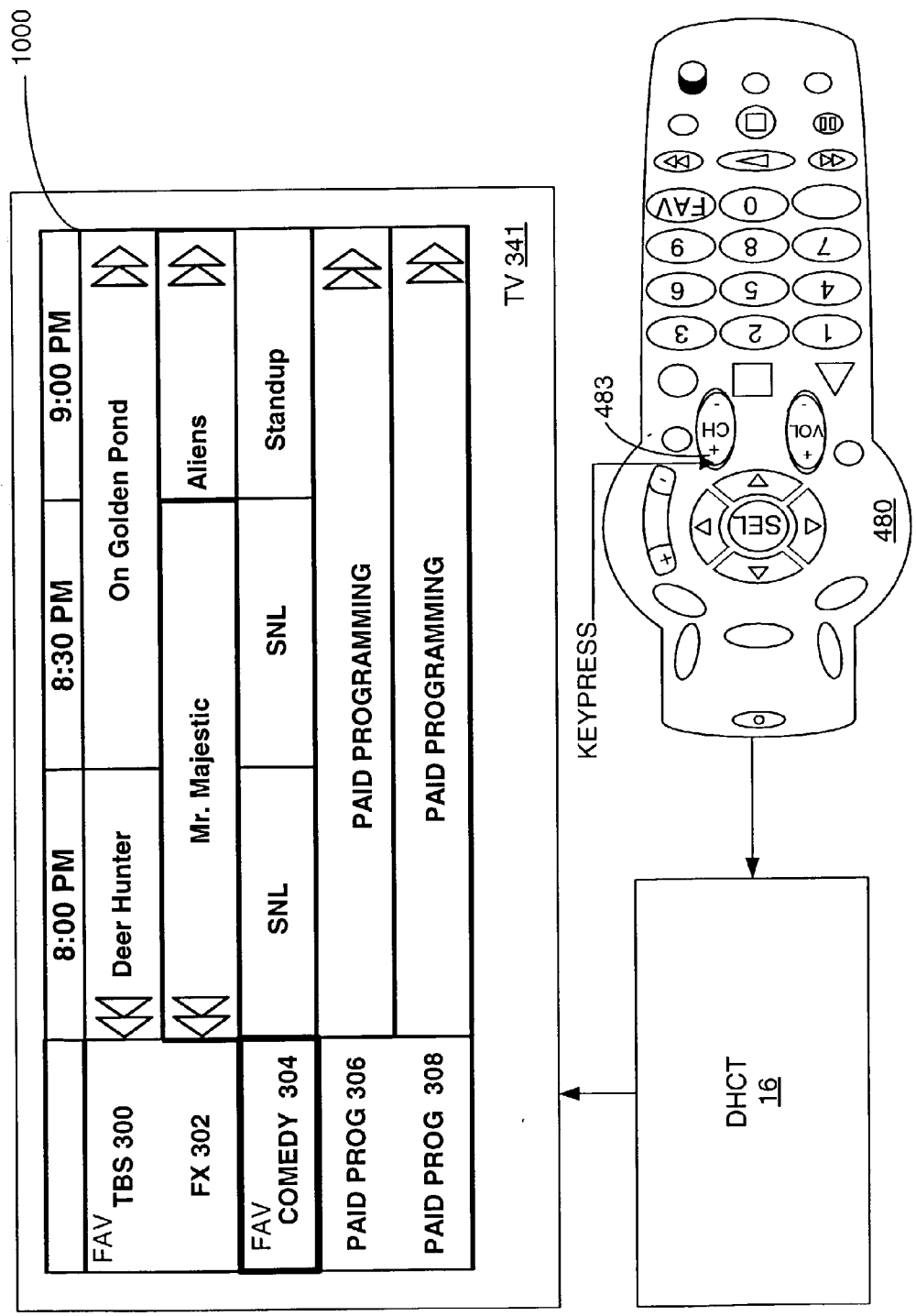
FIGS. 10A-10C are composite diagrams illustrating how to scroll through favorite channels in an IPG screen, in accordance with one embodiment of the invention.
Figure 10B:
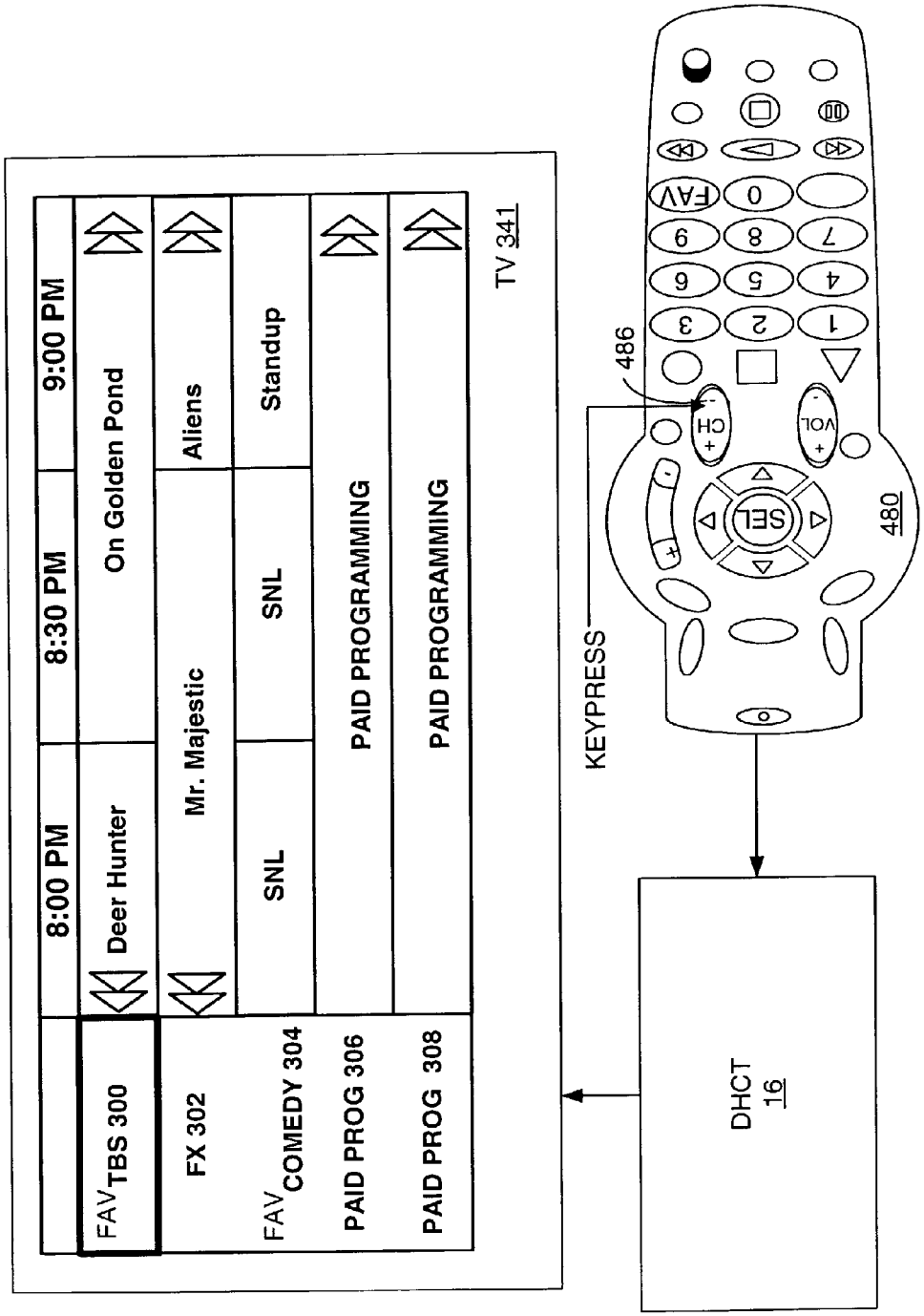
Figure 10C:
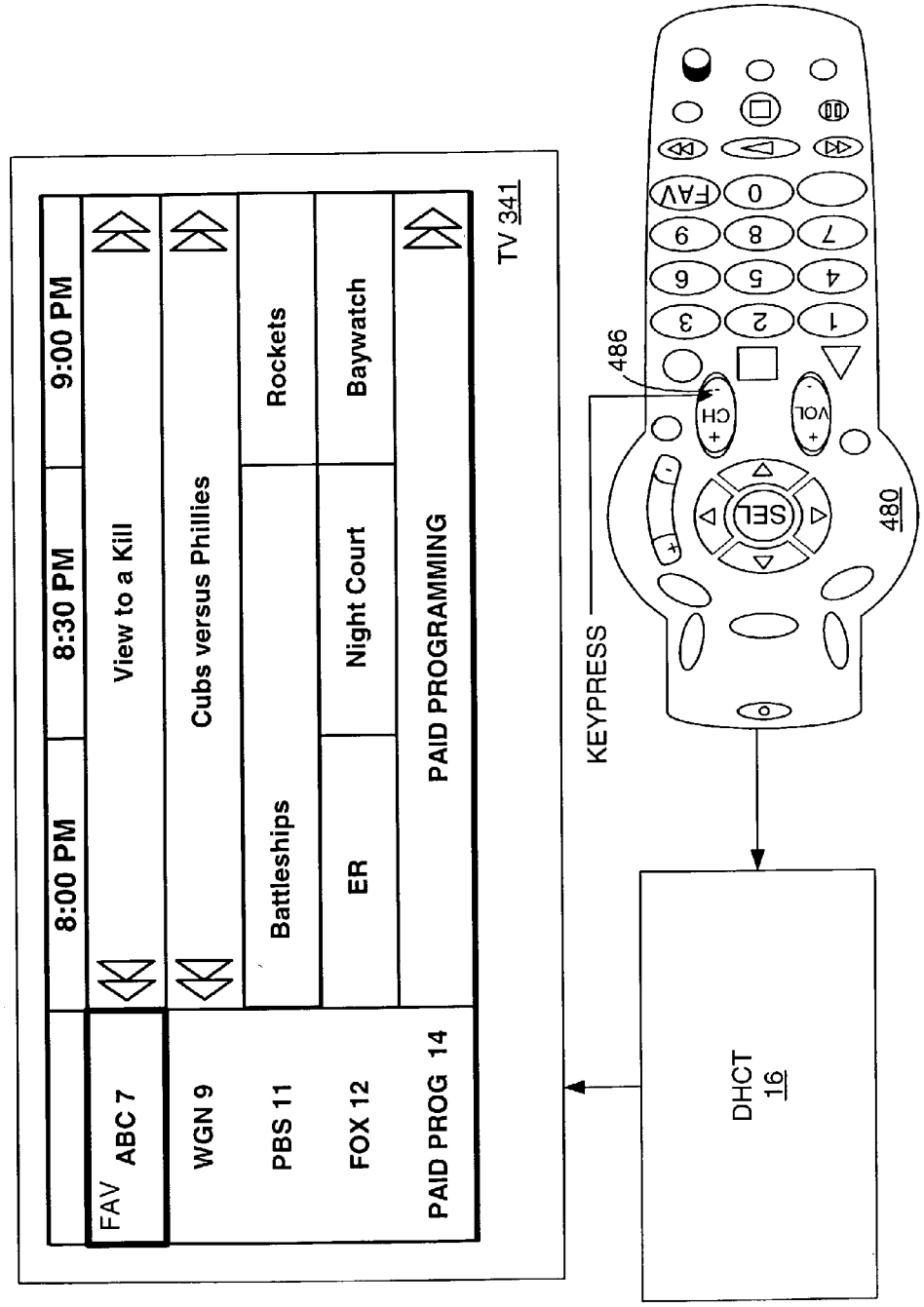

FIGS. 10A-10C are used to illustrate how to scroll through favorite channels, in accordance with one embodiment of the invention. Preferably, while in the display favorites mode (as reflected by the FAV symbol), the user can scroll between favorite channels using the channel up button 483 and channel down button 486 (FIG. 4), in accordance with one embodiment of the invention. Scrolling between favorite channels will herein be understood to include scrolling to favorite channels while skipping over non-favorite channels. Note that in other embodiments, the scrolling function can be implemented by using other buttons, such as the navigation arrow buttons 485, page up/down buttons, etc. FIG. 10A is structured similarly to the composite diagrams of FIGS. 8 and 9, and includes the TV set 341 with a displayed IPG screen 1000, a DHCT 16, and a remote control device 480. Assume the user is currently in the display favorites mode, and assume the user wants to scroll through the available favorite channels beginning from the TBS channel (Ch. 300). In one embodiment, the user selects the channel up button 483, as indicated by the "keypress" in FIG. 10A, which causes the next higher numbered favorite channel (Comedy Central, Ch. 304) to be scrolled to (as indicated by the highlighted display channel 304).

If the user seeks to scroll to lower numbered favorite channels, the user selects the channel down button 486, as shown in FIG. 10B. As a result of selecting the channel down button 486 from the Comedy Central channel, the next lowest numbered display channel (Channel 300, TBS) that is a favorite channel is scrolled to (and thus highlighted). FIG. 10C illustrates an implementation where the user selects the channel down button 486 again from the TBS channel, which highlights the next lowest numbered favorite channel, channel 7 (ABC). Note that in other embodiments, a reverse mechanism can be employed where, for example, by selecting the channel up button 483 while in the display favorites mode, a lower numbered favorite channel is scrolled to and displayed.

Similar mechanisms are employed when using the remote control device 580. While in the display favorites mode (via selecting the display favorites button 592 (FIG. 5)), the user selects the channel up button 583 (FIG. 5) or the channel down button 586 (FIG. 5) to enable scrolling through the favorite channels in both channel directions. Further, as described above, similar mechanisms are employed while scrolling among favorite channels while media content instance presentations are displayed (e.g., as in FIGS. 9A-9B). For example, to scroll to a higher numbered favorite channel, the user selects the channel up button 483 (FIG. 4) while in the display favorites mode and is presented with a media content instance presentation screen associated with the higher numbered favorite channel.

Figure 11:
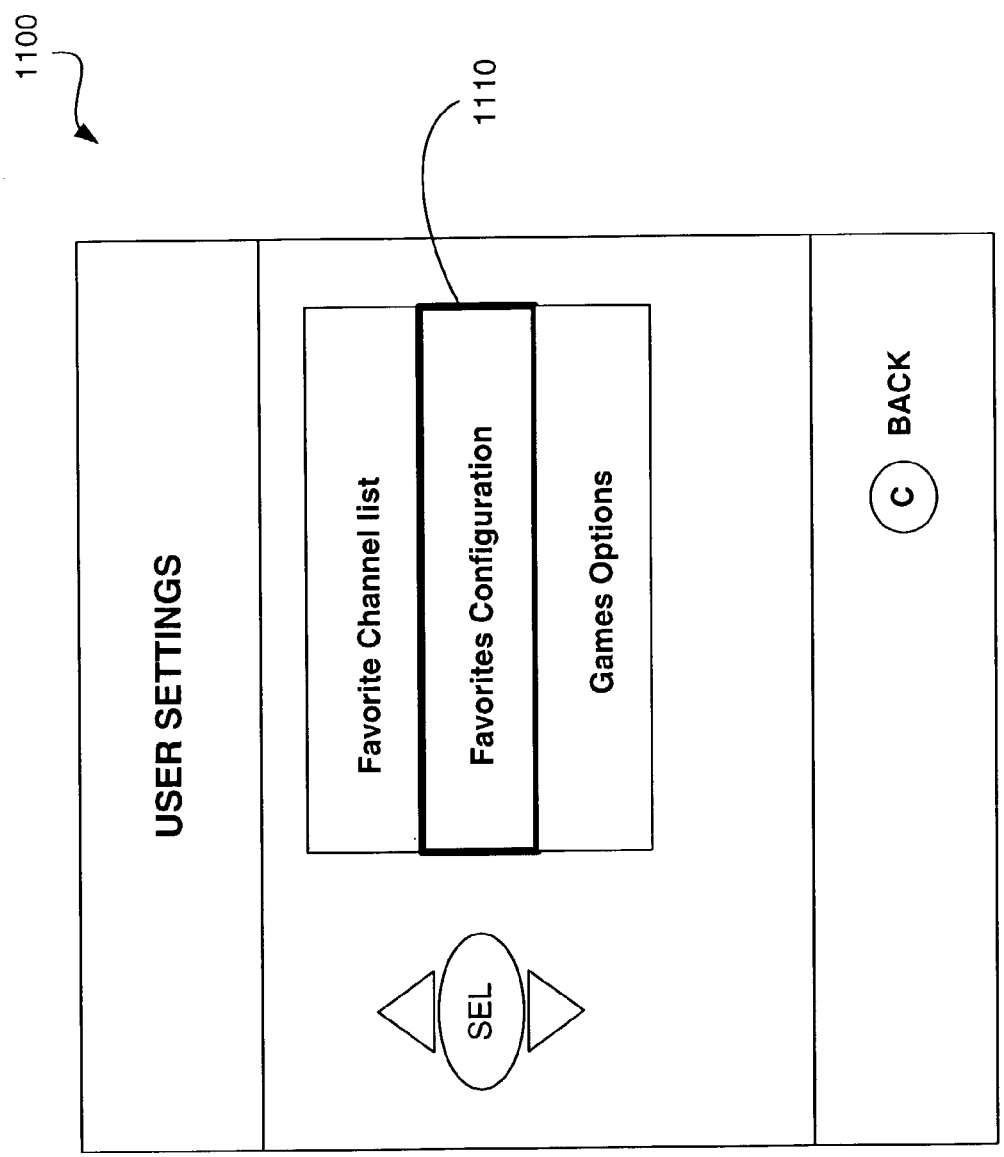
FIG. 11 is a screen diagram of an example user settings menu screen for displaying favorite channel configuration screens, in accordance with one embodiment of the invention.
Figure 12:
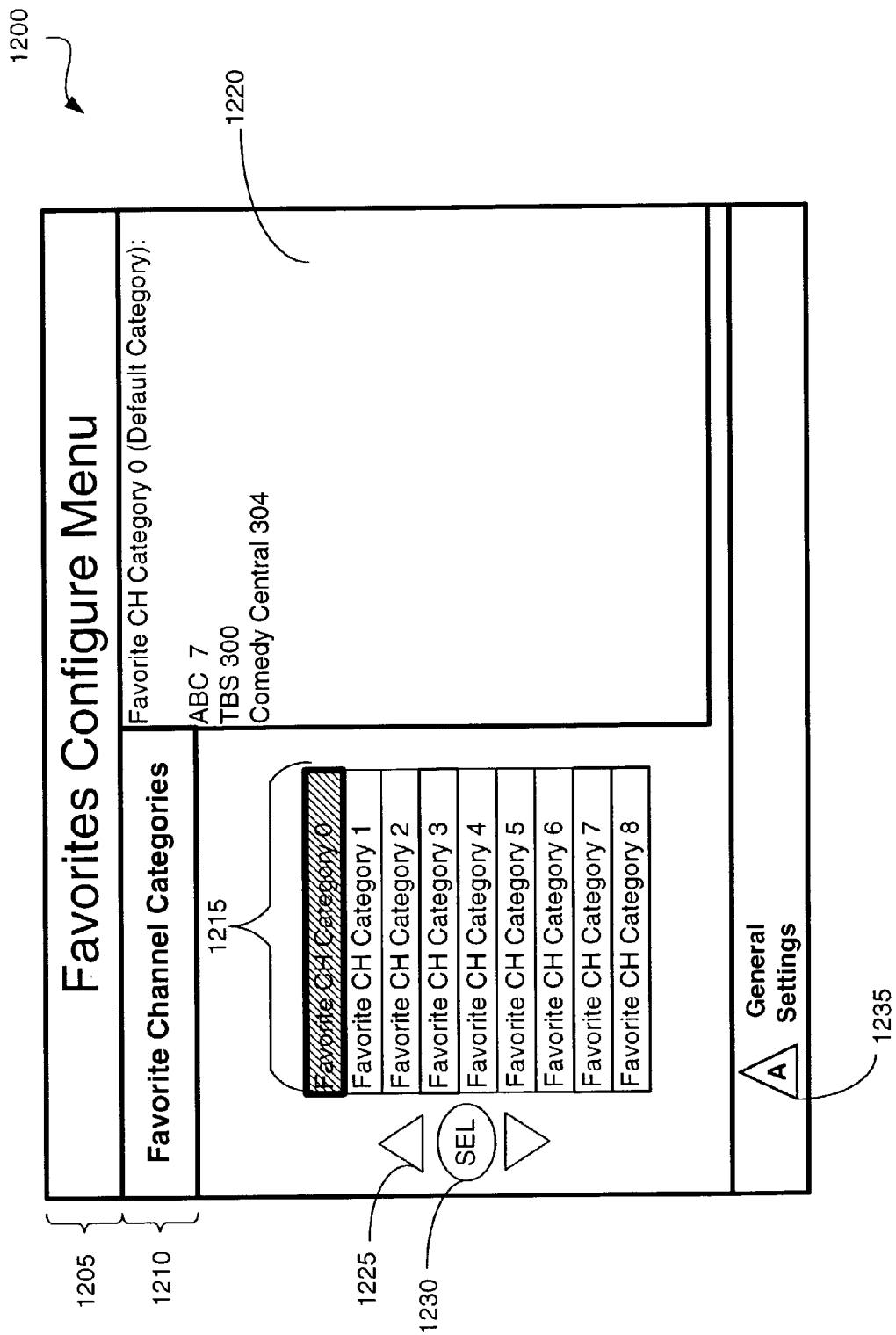
FIGS. 12-18 are screen diagrams of example favorite channel configuration screens that illustrate how to configure favorite channel categories, in accordance with one embodiment of the invention.

The preferred embodiments of the invention can include the ability to view favorite channels in a plurality of favorite channel categories (herein, favorite channel categories will be referred to as categories or favorites categories). Such categories can include, for example, comedy channels, sports channels, and news channels, among others. In one implementation, by selecting a particular category of favorite channels, the user can narrow his or her search and display of favorite channels. The user can initiate category configuration by selecting a favorites configuration option from a user settings screen, as one example. FIG. 11 is a screen diagram of one example user settings screen 1100 that enables a user to configure various functionality for the DHCT 16 (FIG. 3). The options available include, among others shown and not shown, a favorites configuration option 1110. Responsive to selecting the favorites configuration option 1110, the user is presented with one example favorites configure menu screen 1200 as shown in FIG. 12.

The example favorites configure menu screen 1200 includes a header 1205 identifying the example screen, a subheader 1210 identifying the favorite channel categories list 1215 positioned below the subheader 1210, and a favorites display screen 1220 that lists and describes the current favorite channels for the category highlighted in the favorite channel categories list 1215. For example, in the favorites display screen 1220, the favorite channel category 0 is described as a default, or general, favorite channel category. For example, favorite channel additions in implementations using just the default category, or where the user has not selected a category for addition, will preferably be included in the favorite channel category 0. The default category is preferably altered in appearance in the favorite channel categories list 1215 (e.g., by shading) to suggest to the user that configuration by category is prohibited. In other embodiments, the default category can be configured and/or customized, or omitted. Assuming prior favorites selections, the favorite channel category 0 includes favorite channels entitled ABC, TBS, and Comedy Central. The example favorites configure menu screen 1200 also includes navigation arrow icons 1225 for scrolling to a particular favorite channel category in the favorite channel categories list 1215, and a select arrow icon 1230 for selecting a highlighted favorite channel category. Further, the favorites configure menu screen 1200 includes a general settings icon 1235 that suggests to the user that selecting the corresponding button ("A" button 488, FIG. 4) on a remote control device 480 (FIG. 4) will result in the presentation of the general settings menu screen 1100 (FIG. 11).

Figure 13:
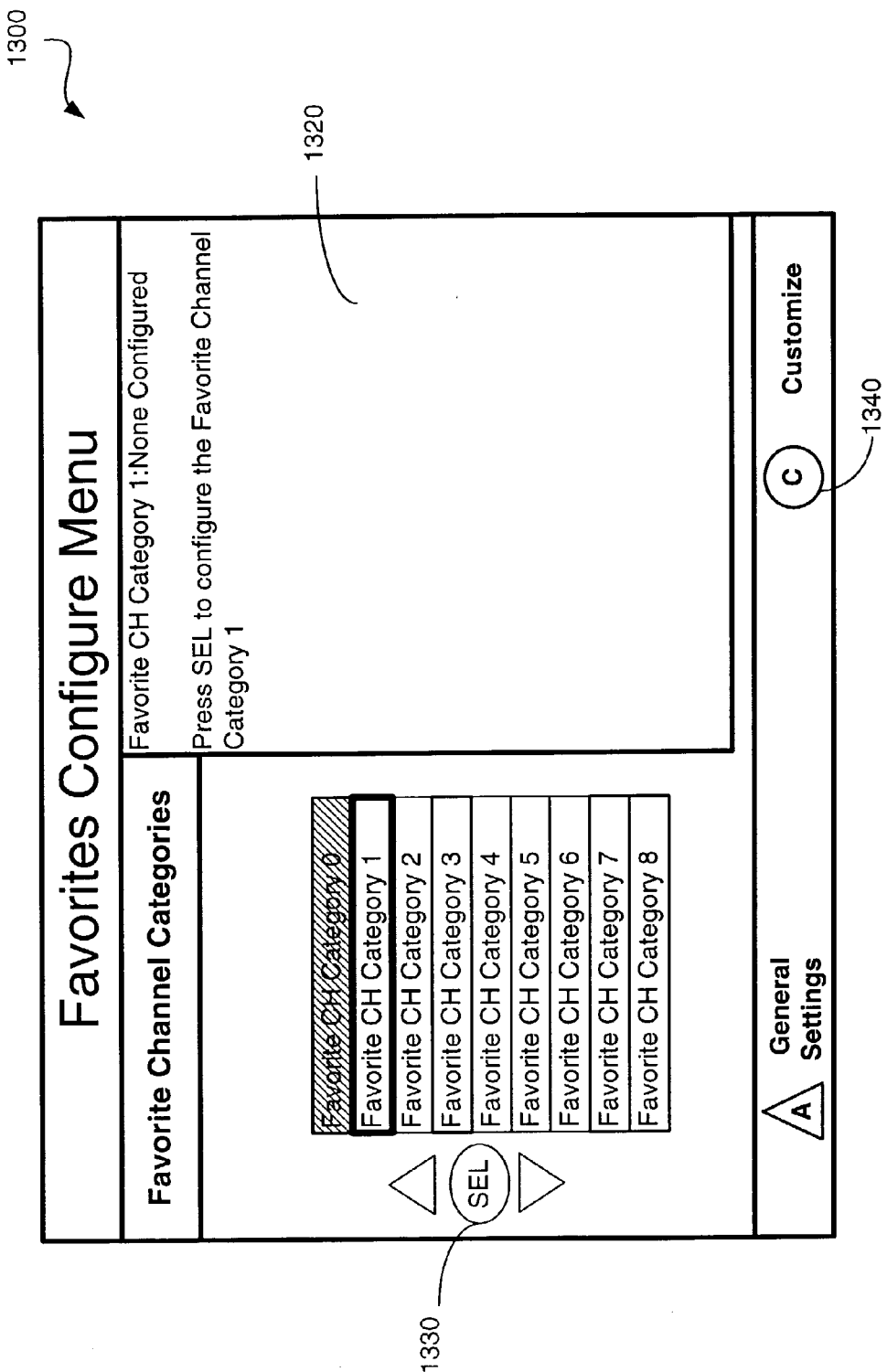

Assume the user scrolls to favorite channel category 1, as shown in the example favorites configure menu screen 1300 (FIG. 13). The favorites display screen 1320, which shows no favorite channels currently listed for that selected category, instructs the user to press the select button 487 of the remote control device 480 (FIG. 4) (as suggested by the select button icon 1330) to configure the selected favorite channel category 1. The example favorites configure menu screen 1300 also includes a customize button icon 1340, which when selected, provides a screen that enables the user to customize a selected favorite channel category.

Figure 14:
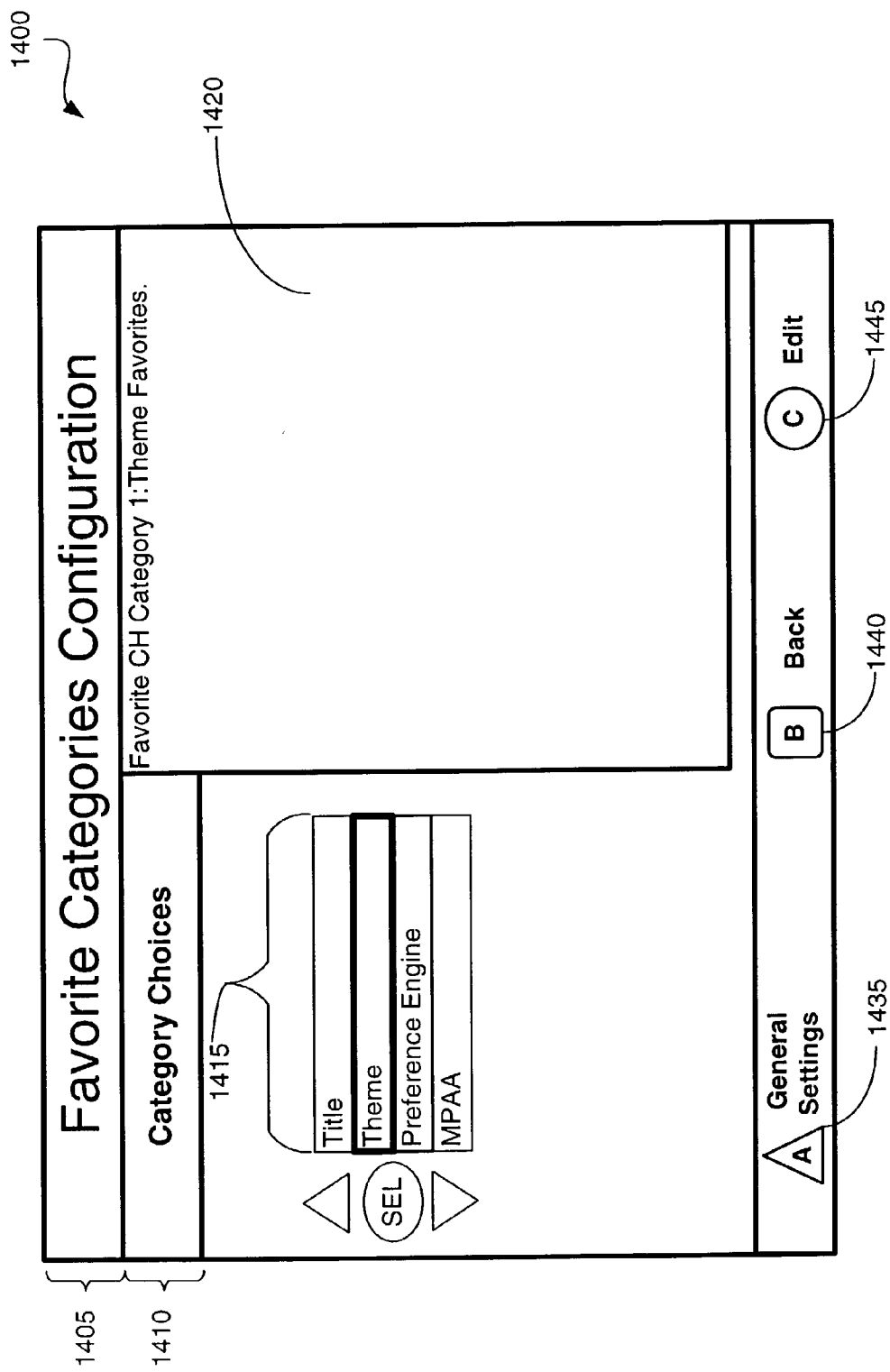

FIG. 14 is a screen diagram of an example favorite categories configuration screen 1400 responsive to the user activating the select button 487 (FIG. 4) on the remote control device 480 (FIG. 4) from the prior example screen 1300 (FIG. 13). The example favorite categories configuration screen 1400 includes a header 1405 for identifying the example screen 1400, and a subheader 1410 that is used to identify the category choices list 1415 positioned below the subheader 1410. The category choices list 1415 includes various pre-configured categories that can be used to categorize favorite channels. For example, categories include the theme of the content (e.g., comedy, suspense, action, etc.), the title of the content (e.g., news, sports, etc.), the Motion Picture Artist Association (MPAA) rating or other ratings (e.g., R, PG, etc.), and preference engines, among others. A preference engine defines a search criteria for finding (and subsequently providing) media content that is preferred by the user (via a preference engine screen not shown). By selecting this category choice, upon finding media content matching the preference engine criteria, a pop-up window or other messaging mechanism can be employed to alert the user to the content and provide the user with the option to add as a favorite channel. Other categories can be used, including user-defined categories.

Figure 15:
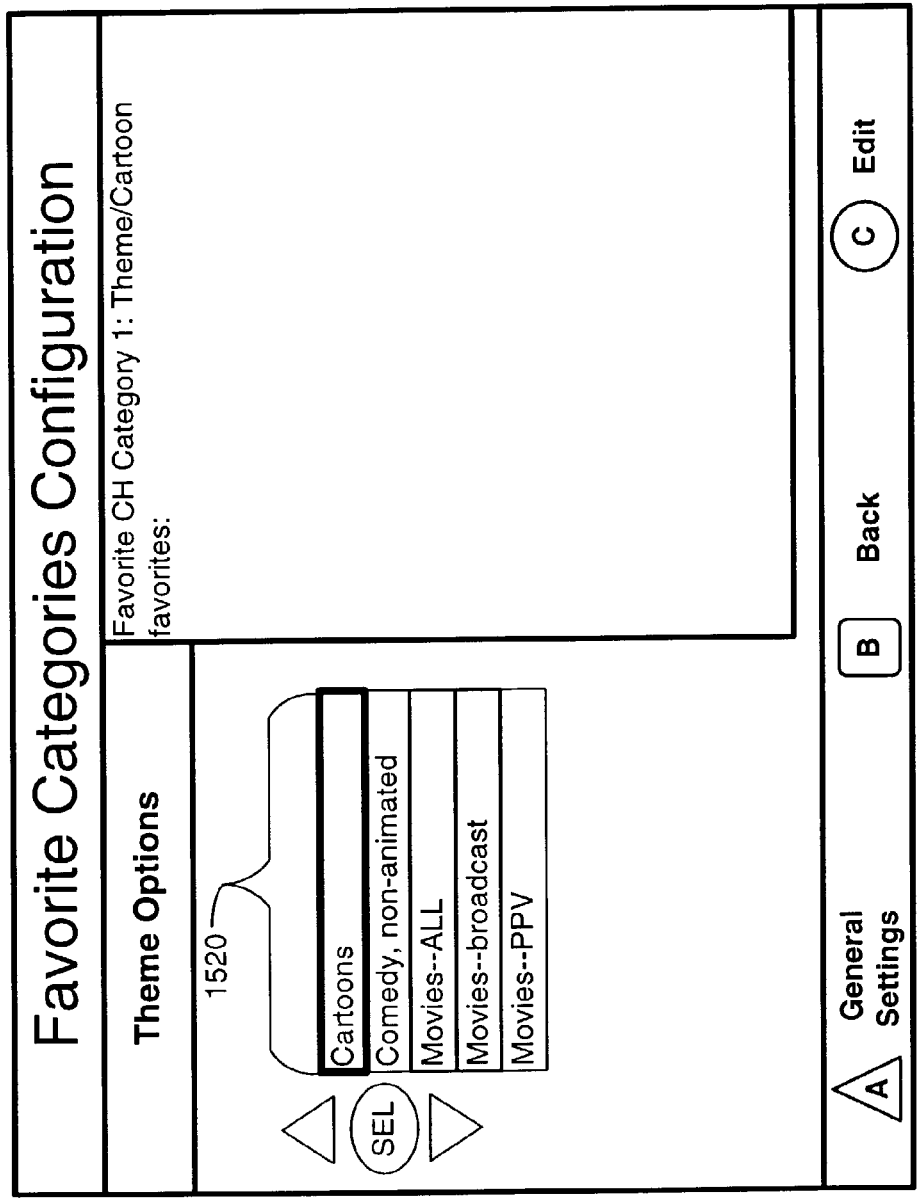

FIG. 14 also includes a favorites display screen 1420, a general settings button icon 1435, a back button icon 1440, and an edit button icon 1445. The back button icon 1440 suggests to the user that he or she can return to the prior screen by selecting the similarly labeled button (e.g., "B" button 489, FIG. 4) on the remote control device 480 (FIG. 4). The edit button icon 1445 suggests to the user that he or she can, for example, add or delete favorite channels listed in the favorites display screen 1420 by editing in a separate screen (not shown). Assume the user decides to configure a category by the category choice of "theme," and thus highlights and selects "theme" from the category choices list 1415, resulting in the example favorite categories configuration screen 1500 depicted in FIG. 15.

Figure 16:
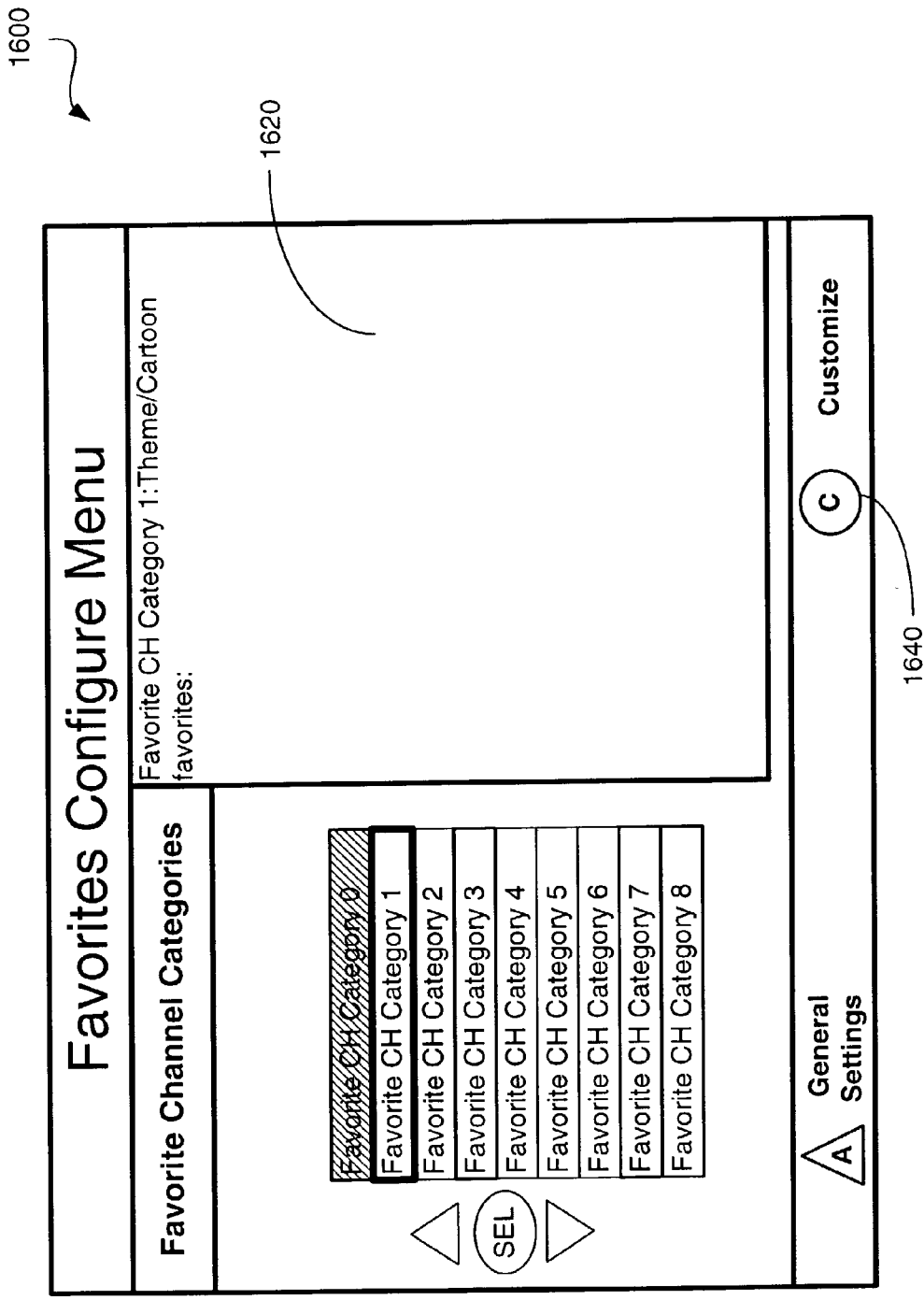

The example favorite categories configuration screen 1500 includes theme options in a theme options list 1520, which includes further refinements to the theme category choice selected in the prior screen 1400. As shown, the theme options list 1520 includes such themes as cartoons, comedy, and movies, among others. Assume the user decides that the favorite channel category 1 will include cartoon favorites, and thus the user highlights and selects that option from the theme options list 1520, resulting in the example favorites configure menu screen 1600 shown in FIG. 16. As shown in the favorites display screen 1620, the favorite channel category 1 is for favorite channels that include media content having a cartoon theme.

Figure 17:
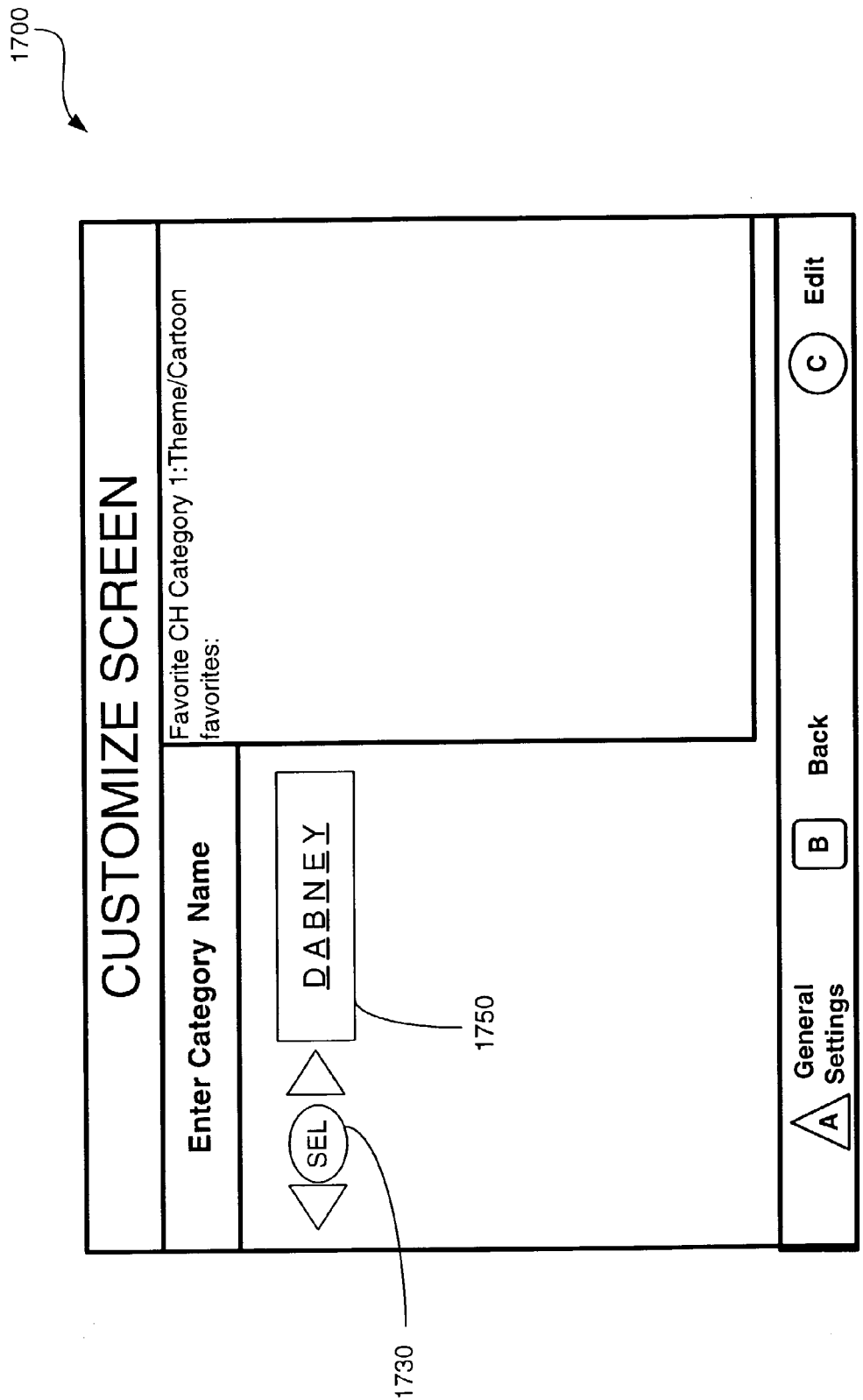

The example favorites configure menu screen 1600 also includes a customize button icon 1640 that enables a user to customize a selected favorite channel category. By selecting the customize button icon 1640 (i.e., by selecting the ""C" button 490 on the remote control device 480), the user is presented with the example customize screen 1700 of FIG. 17. The example customize screen 1700 includes an entry box 1750 wherein the user can enter a name for a particular category, including his or her name or other identifying indicia to personalize the selected favorite channel category. The user can enter numbers from the alphanumeric buttons 491 of the remote control device 480 (FIG. 4), as one example, wherein the entered numbers correspond to displayed letters of the alphabet according to well-known alphanumeric entry mechanisms.

Figure 18:
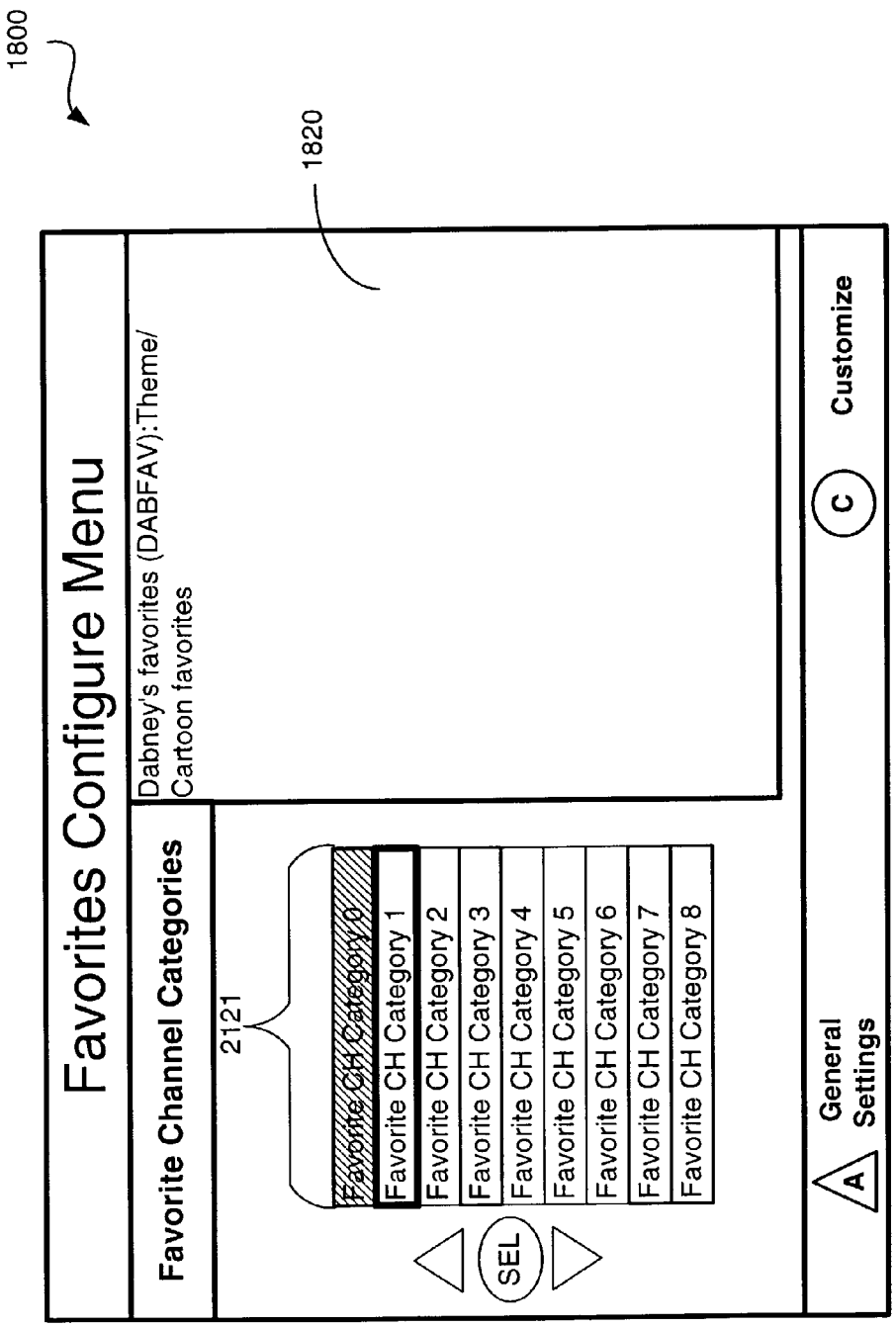

In this example, the user has entered his name, and presses the select button 487 on the remote control device 480 (FIG. 4) (as suggested by the select button icon 1730), resulting in the example favorites configure menu screen 1800 shown in FIG. 18. The personalized favorite channel category 1 is indicated in the favorites display screen 1820 (e.g., Dabney's favorites). The abbreviated "DABFAV" is preferably a symbol that will be internally generated (by the navigator 355, FIG. 3) and used to identify which favorites category on an IPG screen or presentation screen that the user is currently accessing and/or manipulating. In one implementation, the navigator 355 can use the first three letters of the name entered in the entry box 1750 (FIG. 17) prepended to "FAV". If a favorite channel category is not configured, the abbreviation FAV is preferably used for the default favorite channel, as described above. In other embodiments, the user can choose from a list of symbols (via a symbol configure screen (not shown) evoked from the user settings menu screen 1100 (FIG. 11)) to represent particular categories, for example graphical symbols such as a smiling face for comedy, or a serious face for drama, among others.

Figure 19A:
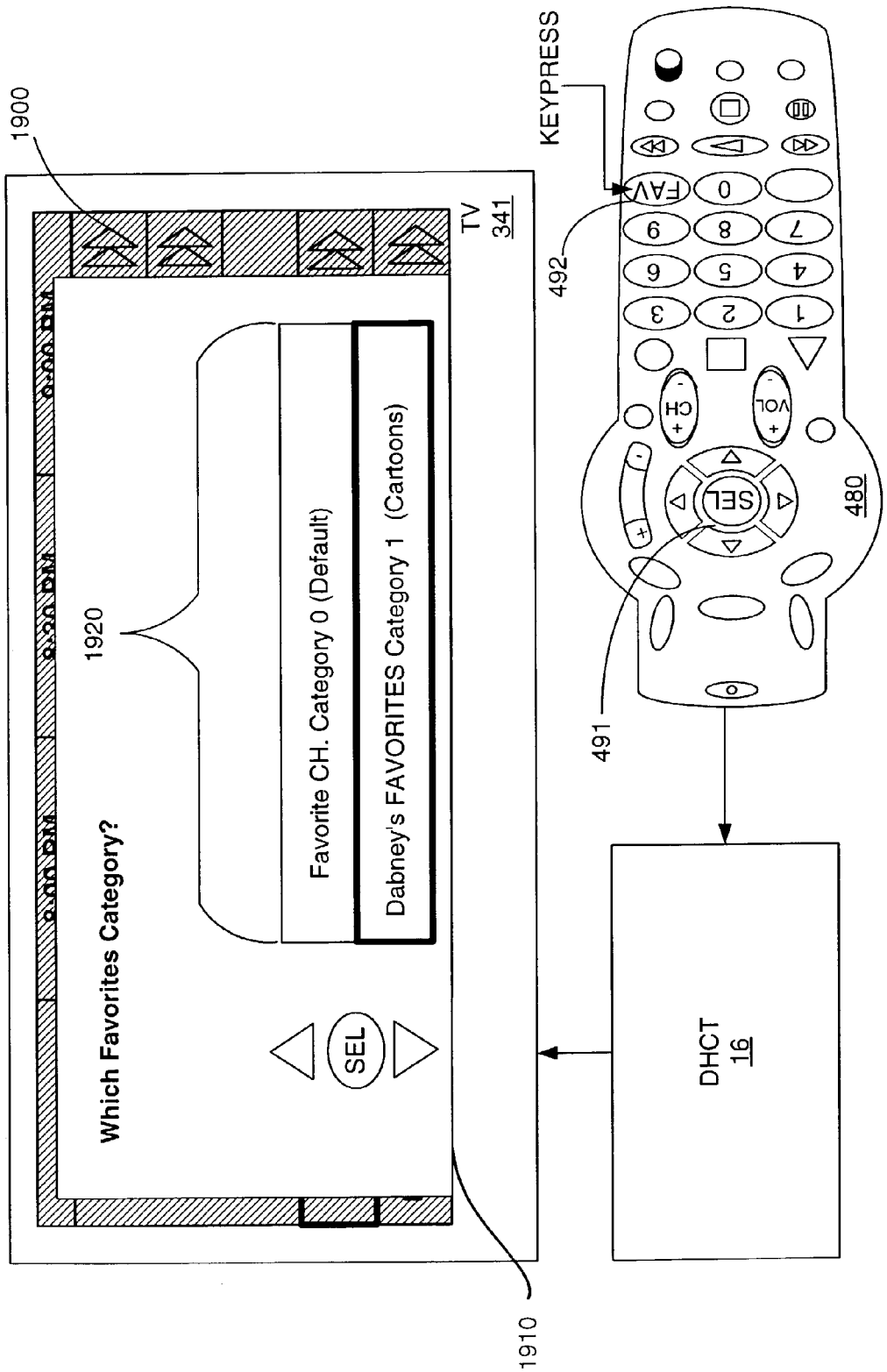

The preferred embodiments of the invention enable a user to add favorite channels to a favorite channel list "on-the-fly", that is, while viewing available media content choices from an IPG screen, or media content from a presentation screen, without returning to a favorite channel list. Thus, the additions to (and deletions from) a favorite channel list is transparent to the user. Several embodiments of the preferred embodiments of the invention are described below in association with FIGS. 19-21. Although described in association with IPG screens, as described above, similar mechanisms are employed for media content instance presentation screens. FIG. 19A is a composite diagram that is used to illustrate one embodiment for adding favorite channels. This embodiment preferably provides the user with a pop-up window to list the current favorite channel categories that are available (e.g., the default category and configured categories). This implementation can arise, for example, where the user does not know, or cannot remember, the favorite channel categories that are available. Based on the prior examples, two categories of favorite channels now exist after the favorite category configurations have occurred: the favorite channel category 0 (default favorite channel category) and favorite channel category 1 (Dabney's cartoon favorites). Assume the user has selected the favorites button 492 momentarily (un-sustained) on the remote control device 480 while viewing listings on an IPG screen to commence the display favorites mode. In one implementation, in response to the user selecting the favorites button 492, an example pop-up window 1910 is presented, preferably overlaid on an IPG screen 1900 that is grayed out or otherwise modified to provide a visual distinction between the example pop-up window 1910 and the IPG screen 1900.

The example pop-up window 1910 notes an ambiguity in determining the intended favorite channel category that the user has selected, and seeks resolution by presenting the two current favorite channel categories in an options list 1920 for the user to choose from. If there were no conflicts (e.g., only one category exists), the pop-up window 1910 would preferably not be displayed, and the default category favorite channels would be displayed.

As shown in the options list 1920 of the example pop-up window 1910, one option is Dabney's cartoon favorites (Dabney's favorite channel category 1). Assume the user seeks to add favorite channels, preferably cartoon channels, to his cartoon favorites channel category (Dabney's cartoon favorite). Thus, upon highlighting and selecting the Dabney's favorite channel category 1 selection from the options list 1920 of the example pop-up window 1910, the user is presented with an example IPG screen similar to that shown in FIG. 19B, but without a FAV symbol. Since no favorites are currently selected, the screen preferably remains at the same display channel as it was from which the display favorites mode was launched. To add the Disney channel 316 to the list of favorite channels in Dabney's cartoon favorites, the user preferably selects the favorites button 492 for a sustained duration. In response, the DABFAV symbol 1970 preferably appears in the display channel area 1980 of the IPG screen 1900 in proximity to the selected Disney channel 316, thus providing feedback to the user that the selected channel is now added to Dabney's cartoon favorites. To add additional favorite channels while in the display favorites mode, the user preferably scrolls to non-favorite channels using the navigation arrow keys 485 (FIG. 4), and then presses the favorites button 492 for a sustained duration for the highlighted selection.

To delete a selection from the favorite channel list under a selected favorites category, the user preferably scrolls to the targeted favorite channel (via using the channel up button 483 or channel down button 486, FIG. 4), and then presses the favorites button 492 for a sustained duration. In response, the targeted favorite channel is removed from the favorite channel list for that particular category (i.e., the category selected to display favorite channels), and the symbol for the deleted favorite selection disappears (not shown).

Note that implementations using the remote control device 580 (FIG. 5) would operate similarly to that described in association with FIGS. 19A-19B, with differences due to the added functionality included in the display favorites button 592 (FIG. 5) and the add/delete favorite button 594. For example, the user can preferably select the display favorites button 592, and a pop-up window similar to that described in association with FIG. 19B would responsively be presented to resolve any conflict when more than one favorites category is available (or not be presented if only one category existed, as described above). After selecting an option from the pop-up window, the user can add to a favorite channel list or delete from a favorite channel list using the add/delete favorites button 594.

Figure 20A:
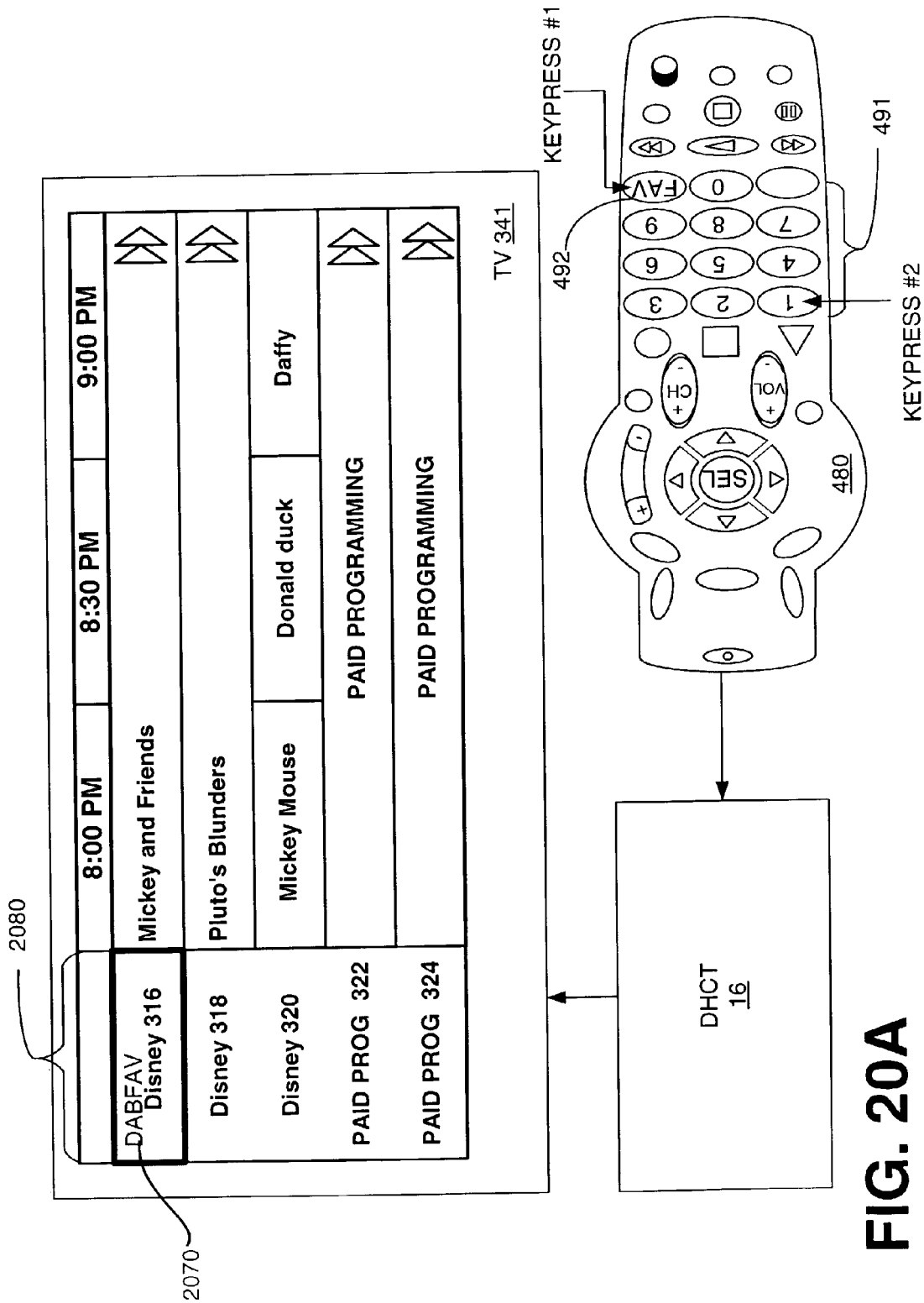
FIGS. 20A-20B are composite diagrams that illustrate a second embodiment for adding favorite channels to a configured favorite channel category, in accordance with one embodiment of the invention.
Figure 20B:
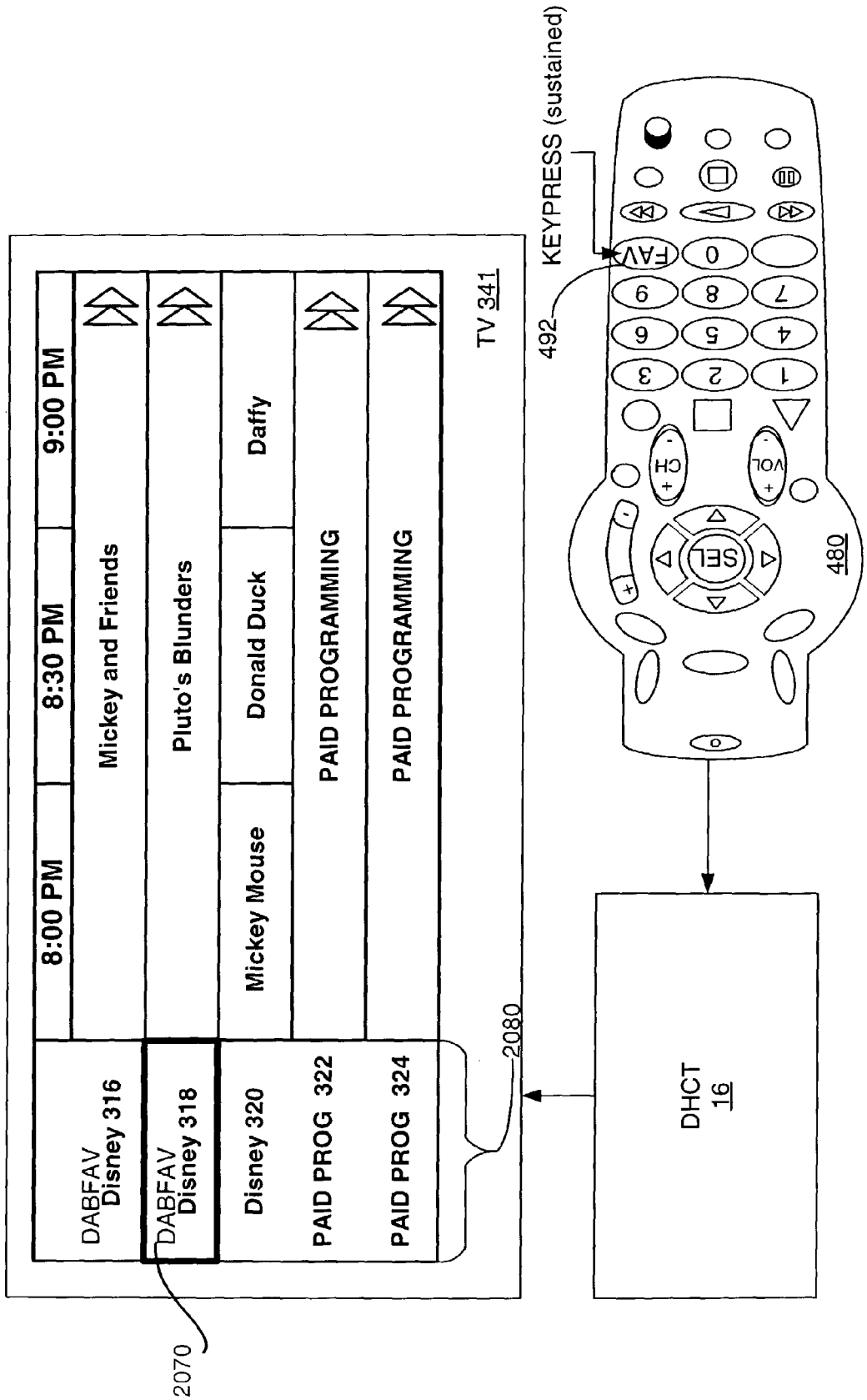

FIGS. 20A-20B are composite diagrams that are used to illustrate another embodiment for adding (or deleting) favorite channels to (or from) a favorite channel list, for example where the user knows the particular favorite channel category he or she wishes to add to (or delete from). In FIG. 20A, the user commences the display favorites mode for favorites category 1 by first pressing (in an un-sustained manner) the favorites button 492 and, shortly after (e.g., within approximately one second), pressing the number of the favorites category the user seeks to add to, which in this example is the "1" button of the alphanumeric buttons 491 corresponding to the favorite channel category 1 (i.e., Dabney's cartoon favorites). In response, the user is presented with the only favorite channel in Dabney's cartoon favorites (e.g., the Disney channel 316 as added previously). Assume the user wants to add the Disney channel 318. The user scrolls to (e.g., using the navigation buttons 485, FIG. 4) and highlights the Disney channel 318, and presses the favorites button 492 for a sustained duration, as shown in FIG. 20B. This keypress action implemented by the user causes the Disney Channel 318 to be added to Dabney's cartoon favorites, as affirmed by the "DABFAV" symbol 2070 which responsively appears in proximity to the Disney channel 318 in the display channel area 2080. Deletion is handled in a manner similar to that described above in association with FIGS. 19A-19B.

The implementation described in association with FIGS. 20A-20B can be handled using the remote control device 580 (FIG. 5) in a similar manner, with differences due to the added favorites button functionality as described above. For example, to commence the display favorites mode for favorite channel category "1", the user preferably presses in brief succession (as described above) the display favorites button 592 (FIG. 5) followed by the number "1" from the alphanumeric buttons 591 (FIG. 5). Following this action, the user adds (or deletes) favorites by highlighting the desired channel and pressing the add/delete favorites button 594 (FIG. 5), which causes a similar response in the IPG screen as described above.

Figure 21A:
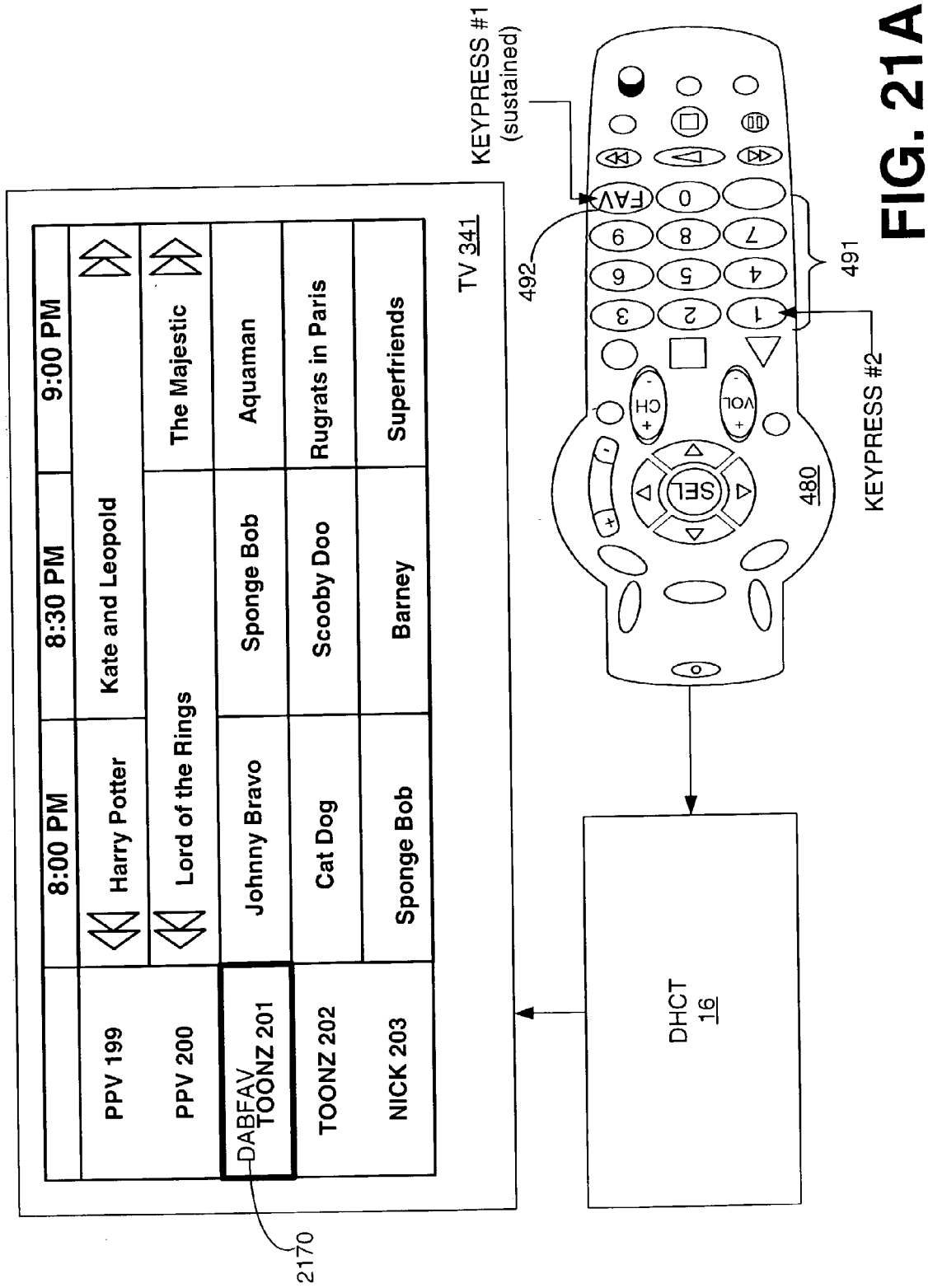
FIGS. 21A-21D are composite diagrams that illustrate a third embodiment for adding and deleting favorite channels to a configured favorite channel category, in accordance with one embodiment of the invention.
Figure 21B:
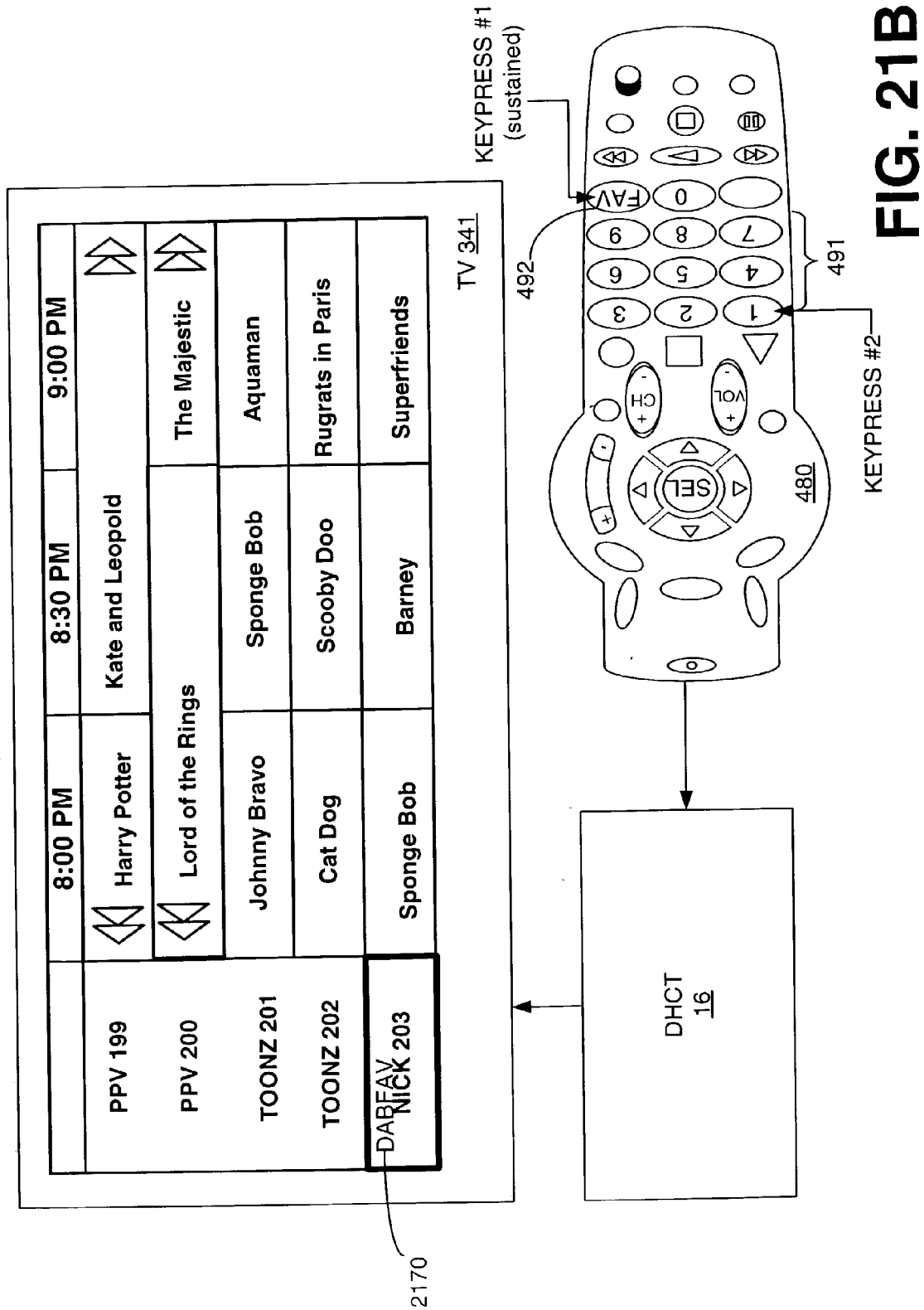
Figure 21C:
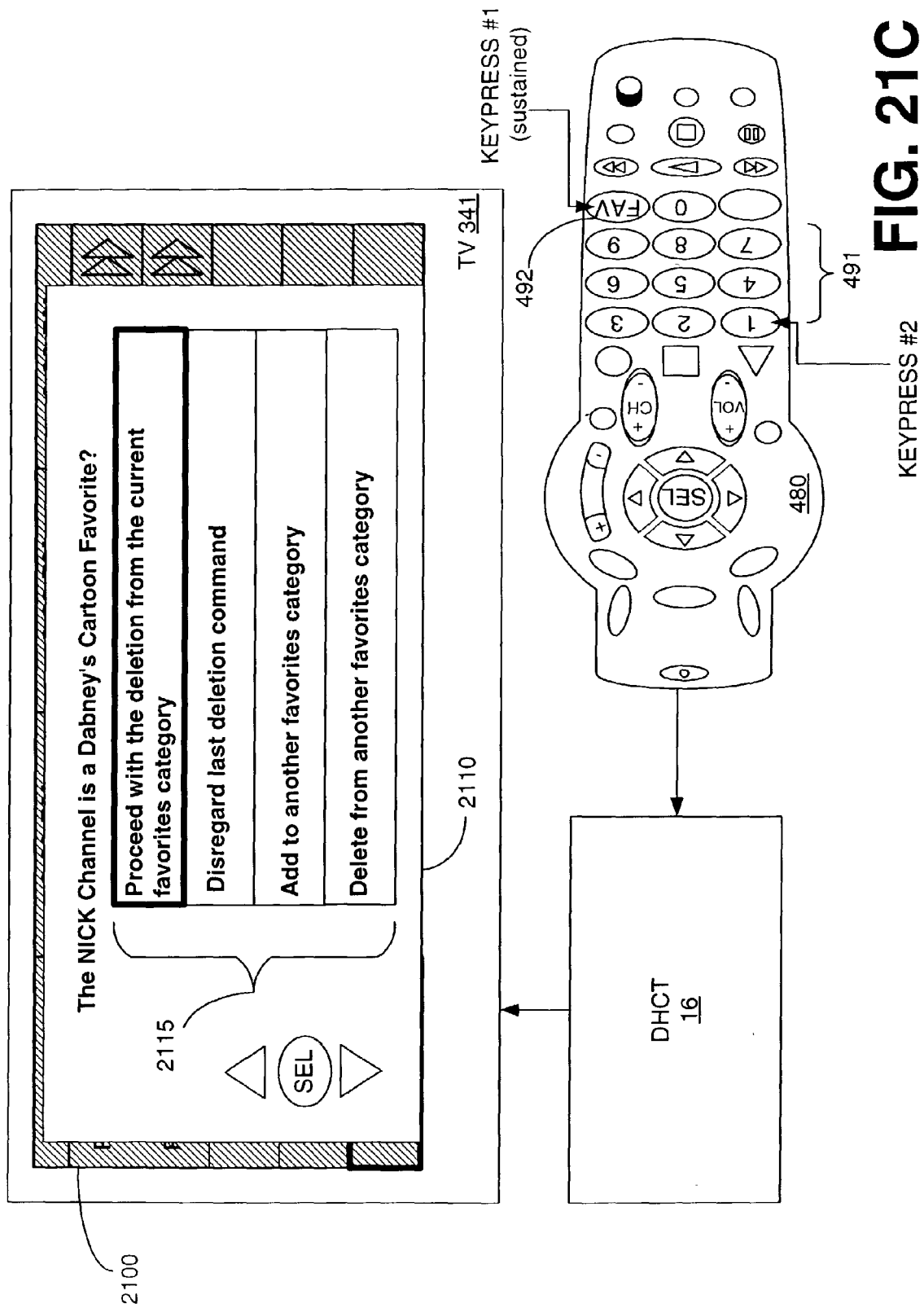

FIGS. 21A-21C are composite diagrams that are used to illustrate another embodiment for implementations where the user adds (or deletes) favorite channels to (or from) a known category of favorite channels without commencing the display favorites mode, or where no favorites category yet exists. Assume the user is viewing listings in an IPG screen and decides to add a highlighted channel to a favorite channel list for favorite channel category 1. As shown in FIG. 21A, the user presses the favorites button 492 for a sustained duration, briefly followed by the number "1" of the alphanumeric buttons 491, corresponding to adding the Toonz channel 201 to Dabney's cartoon favorites. Note that if the only favorite channel category existing was the default favorite channel category (favorites category 0), or in other embodiments no category exists, the user simply presses the favorites button 492 for a sustained duration to add a display channel to the default favorite channel category (or to generate a category). Responsive to the aforementioned keypress actions by the user, the Toonz channel 201 is added to Dabney's cartoon favorites, and the "DABFAV" symbol 2170 can be momentarily displayed (i.e., the symbol times-out after a pre-defined time limit) in proximity to the added favorite channel to provide feedback to the user of a successful addition to Dabney's cartoon favorites.

As another example, assume the user seeks to add the Nickelodeon (NICK) channel 203 to Dabney's cartoon favorites. As shown in FIG. 21B, the user preferably scrolls to the NICK channel 203 and presses the favorites button 492 for a sustained duration, followed shortly by the number "1" of the numeric buttons 491. Responsively, the selection is added to Dabney's cartoon favorites and the DABFAV symbol 2170 can momentarily appear in proximity to the NICK channel 314, providing feedback to the user that the selection has been added to Dabney's cartoon favorites.

A user with the remote control device 580 (FIG. 5) will add channels in the implementation described in association with FIGS. 21A and 21B with shorter duration keypresses. For example, to add a channel to a favorite channel list for a particular favorites category, the user preferably presses the add/delete favorites button 594 (FIG. 5), followed by the number button of the alphanumeric buttons 591 (FIG. 5) associated with the particular category the user desires to add to. If only the default category exists, the user simply presses the add/delete favorites button 594 to add a selected favorite channel.

FIG. 21C is a composite diagram that illustrates the embodiments described in association with FIGS. 21A and 21B for implementations where a user's keypress actions can result in the deletion of a favorite channel from a favorite channel category. For implementations where the user first displays the current favorites (e.g., by commencing a display favorites mode), it is evident to the user what channels are favorite channels and which channels are not favorite channels (e.g., as evidenced by the presence or absence of the favorites symbol). In the embodiments described for the implementations illustrated in FIGS. 21A-21B, the user is not provided with a visual confirmation of the current favorite channels prior to adding to or deleting from a favorite channel list. Thus, a slightly different mechanism is used to handle the addition and deletion of favorite channels for these types of implementations. For example, from user actions illustrated in FIG. 21B, the NICK channel 203 (FIG. 21B) is added as a Dabney's cartoon favorite. Assume that the user highlights the NICK channel 314 while channel surfing through the IPG screen 2100 (and the display favorites mode has not been commenced). In one instance, the user may be seeking to add the NICK channel to Dabney's cartoon favorites without remembering that it is already a Dabney's cartoon favorite.

Figure 21D:
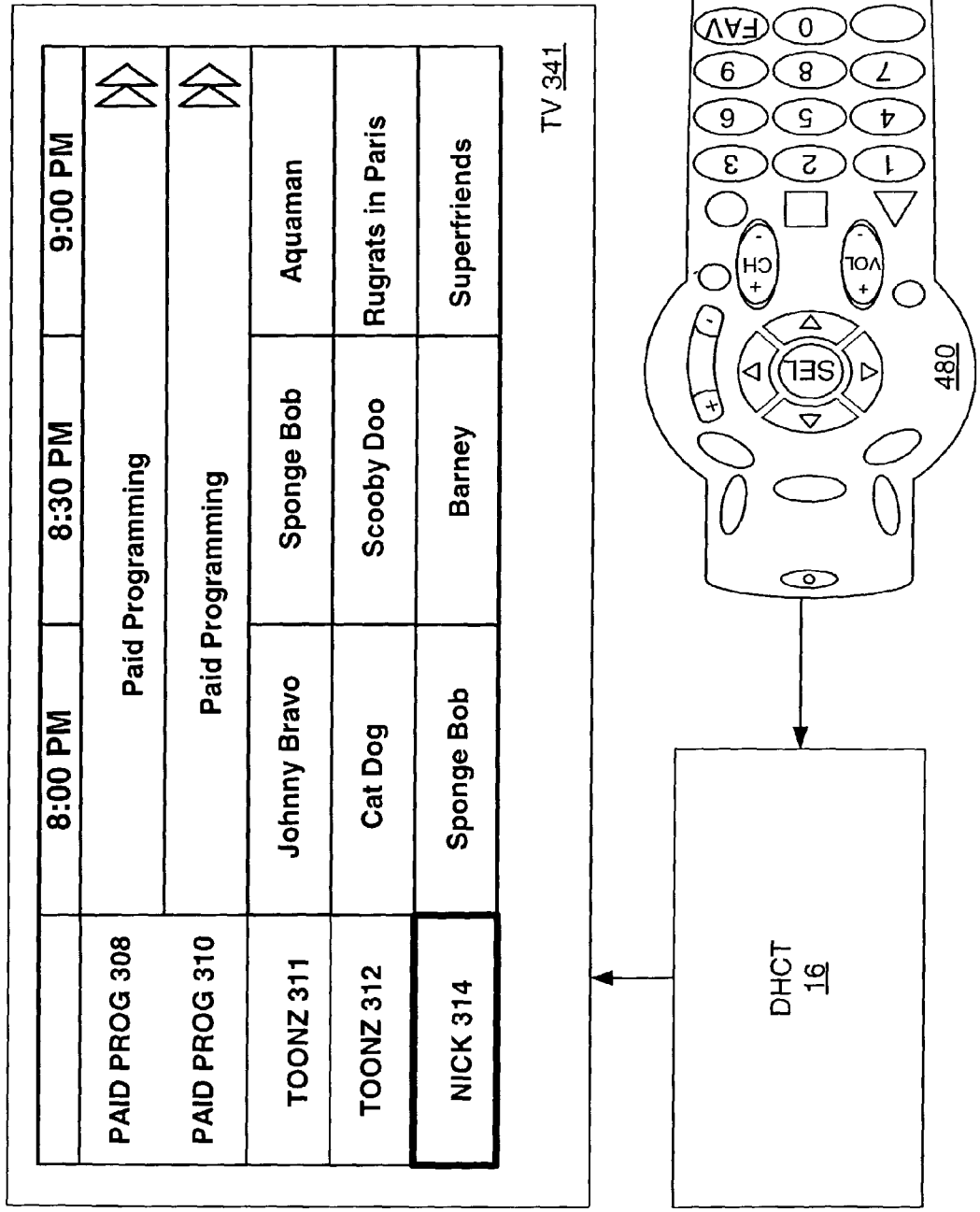

In another instance, the user knowingly seeks to remove the NICK channel 203 from the favorite channel list for that particular category. In either instance, after pressing the favorites button 492 for a sustained duration and then followed shortly by the number "1" from the alphanumeric buttons 491, a pop-up window 2110 can be invoked by the navigator 355 (FIG. 3) and overlaid on the IPG screen 2100 which informs the user that the NICK channel 203 is currently a Dabney's cartoon favorite. The pop-up window 2110 can provide a message that queries the user as to whether he or she really meant to delete the NICK channel 203 from the corresponding favorite channel list. Options are presented in the options list 2115 for the user to select from, including proceeding with the deletion, or disregarding the last command, or adding to another category, among other options. Assuming the user indeed desires to delete the NICK channel 203 from the favorite channel list for Dabney's cartoon favorites, the user highlights and selects the "proceed with the deletion from the current favorite category" option from the options list 2115, with the resultant display as shown in FIG. 21D. Feedback of the successful deletion occurs by the absence of a "DABFAV" symbol. In other embodiments, the pop-up window may not be prompted, thus presenting the possibility of the user action causing the inadvertent deletion of a favorite channel, or a pop-up window may be presented after the deletion informing the user of the deletion of the favorite channel. Note that, although a favorites category was selected in the above example, if there is more than one favorites category and a category was not selected, a pop-up window similar to that illustrated in FIG. 19A can be presented to the user to determine which category the user seeks to add to or delete from.

Using the remote control device 580 (FIG. 5) involves similar mechanisms to that described above. The user presses the add/delete favorites button 594 and then the number "1" (e.g., for Dabney's cartoon favorites) when the targeted favorite channel is highlighted, resulting in a pop-up window similar to that described above.

Figure 22A:
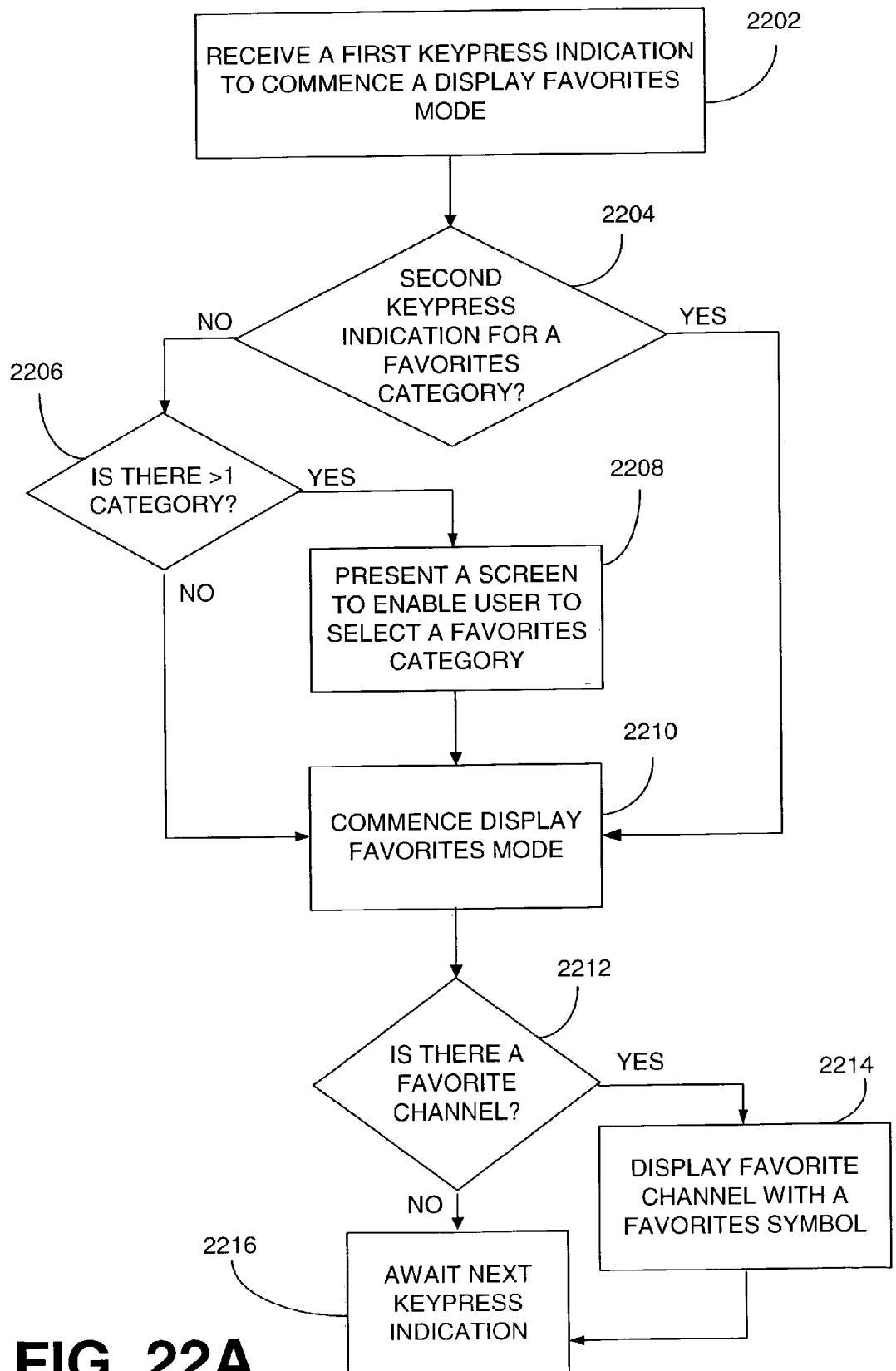
FIGS. 22A-22C are flow diagrams of one example method for commencing a display favorites modes, scrolling through favorite channels, and adding and deleting favorite channels to and from a transparent favorite channel list, in accordance with several embodiments of the invention.
Figure 22B:
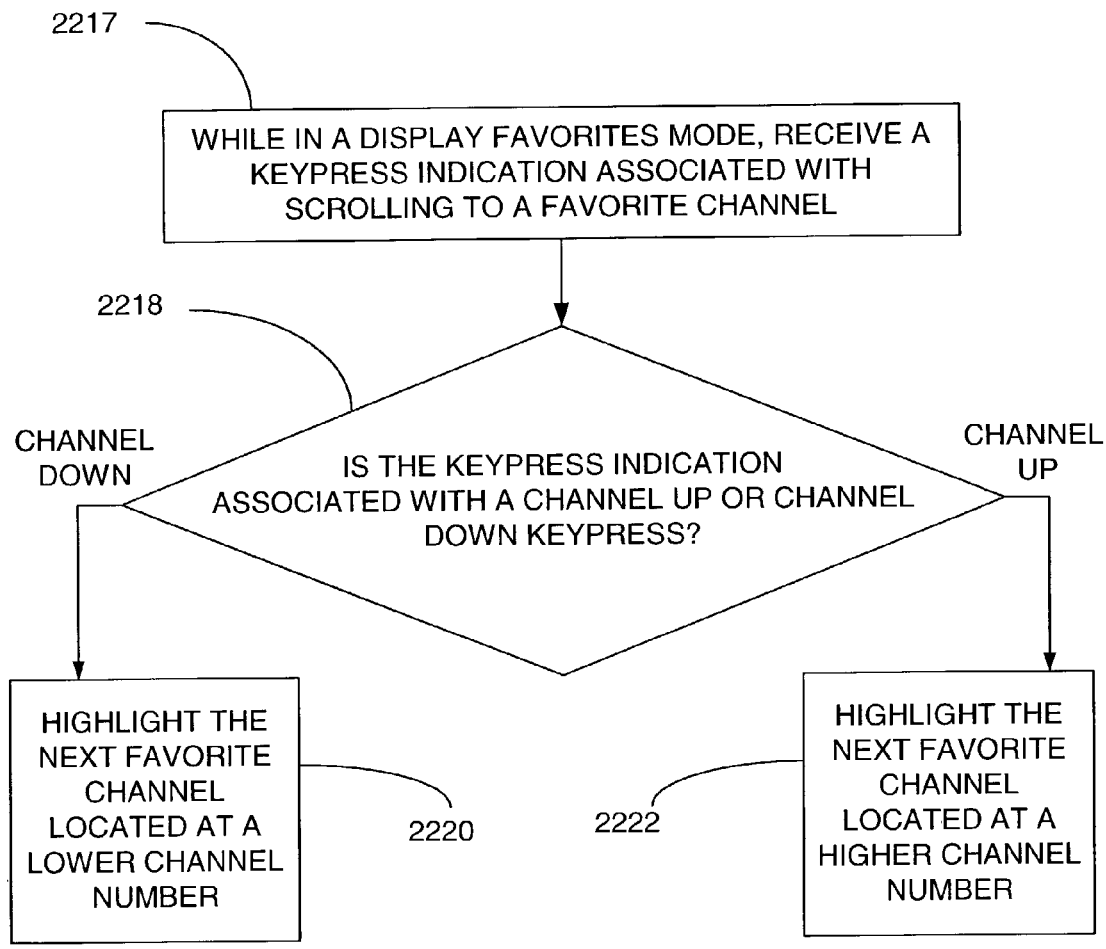
Figure 22C:
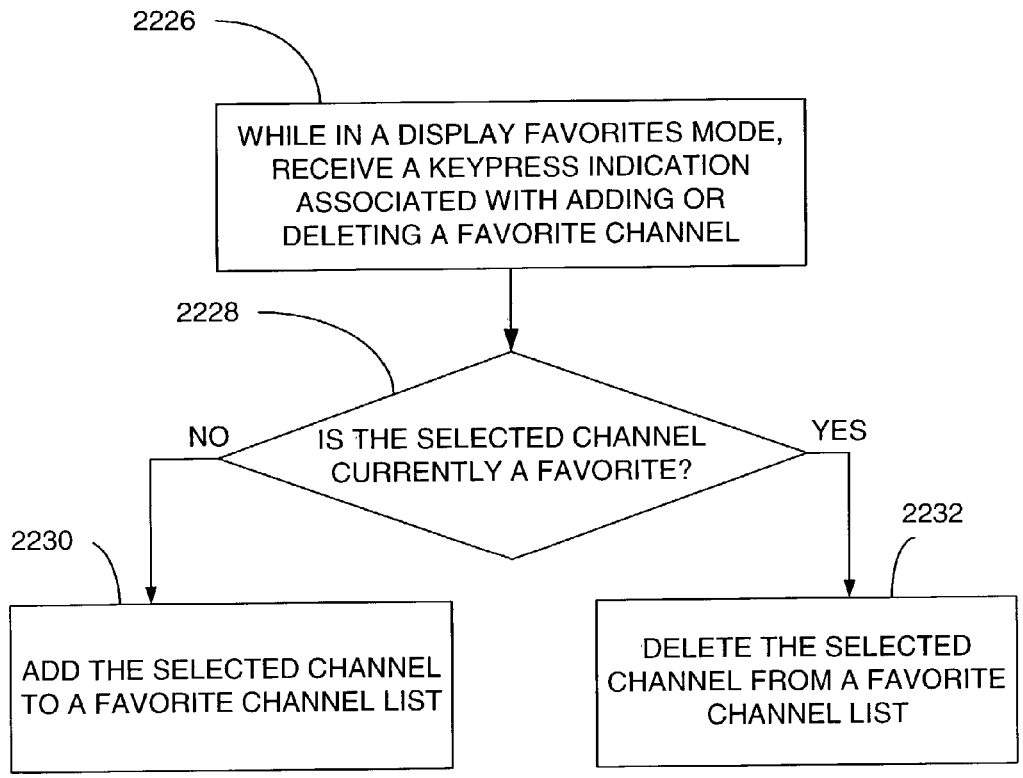

FIGS. 22A-22C are flow diagrams of example methods for commencing a display favorites mode, scrolling through favorite channels while in the display favorites mode, and adding and deleting favorite channels while in the display favorites mode, in accordance with several embodiments of the invention. FIG. 22A is a flow diagram of one example method for commencing a display favorites mode. Step 2202 includes receiving a first keypress indication associated with commencing a display favorites mode. For example, the user may press the favorites button 492 (FIG. 4) on the remote control device 480 in an un-sustained manner, or the display favorites button 592 (FIG. 5) on the remote control device 580 in an un-sustained manner, which results in the first keypress indication. A second keypress indication is anticipated shortly after the first keypress indication if there is more than one favorite channel category (favorites category) (step 2204). If there is not a second keypress indication, an internal query is made to determine if there is another favorite channel category (favorites category) (step 2206) in addition to a default favorites category. In other embodiments, a default favorites category may not be initially set-up, and thus the internal query centers on whether there are any favorite categories. Continuing, if there is not another favorites category, a display favorites mode is commenced for the default favorites category (step 2210) whereby the next higher favorite channel number in an IPG (or the next higher favorite channel number for a presentation screen from the display channel number of the presentation from which the display favorites mode was launched) is highlighted (or tuned to and presented for the presentation screen) and accompanied by a favorites symbol. If the internal query (step 2206) reveals that another favorites category exists, a user interface screen is presented (step 2208) that preferably alerts the user to the existence of more than one favorites category and queries the user as to which favorites category is of interest to the user. Responsive to a user selection of a particular favorites category in the user interface screen, the display favorites mode is commenced for that selected category (step 2210).

If a second keypress indication associated with selecting a favorites category is received shortly after the first keypress indication (step 2204), for example a keypress indication associated with a signal corresponding to a number or letter from the alphanumeric buttons 491 (FIG. 4) or 591 (FIG. 5), then the display favorites mode for that particular favorites category is commenced (step 2210).

An internal query is made as to whether there are any favorite channels in a corresponding favorite channel list (step 2212). If there is a favorite channel, it is displayed in an IPG with a favorites symbol (or the favorite channel is tuned to and displayed with a favorites symbol that is located in an associated banner or elsewhere on the display for presentation screen implementations) (step 2214), and then there is an anticipation for a next keypress indication (step 2216) after step 2214 or if it is determined that there is no favorite channel in response to the internal query of step 2212. The next keypress indication that is anticipated can be associated with a multitude of user or system actions, such as a power off request, a request to add favorites, a request to exit from the display favorites mode (e.g., by selecting the favorites button 492 (FIG. 4) or display favorites button 592 (FIG. 5) for an un-sustained duration), etc.

An example method for scrolling among favorite channels in an IPG screen (also applicable to scrolling among screen presentations of the instances that are favorites) while in the display favorites mode is presented in FIG. 22B. Step 2217 includes receiving a keypress indication associated with scrolling to a favorite channel while in the display favorites mode. In one implementation described above, the user can press the channel up button 483 (FIG. 4) (or 583 of FIG. 5) or the channel down button 486 (FIG. 4) (or 586 of FIG. 5). If the keypress indication indicates it is associated with a channel down keypress (step 2218), a scroll direction to a favorite channel having a lower display channel number than the favorite channel from which the scroll keypress was launched is implemented and the scrolled to favorite channel is highlighted (or tuned to and displayed for presentation screen implementations) in an IPG screen (step 2220). If the keypress indication is associated with a channel up keypress (step 2218), a scroll in the opposite direction is implemented, and the next favorite channel with a higher channel number is highlighted (tuned to and displayed for presentation screen implementations) (step 2222).

Assume the user seeks to add or delete one or more favorite channels using the remote control device 480 (FIG. 4) or 580 (FIG. 5), as illustrated in FIG. 22C. Step 2226 includes receiving a keypress indication associated with either adding to a favorite channel list or deleting from a favorite channel list while in the display favorites mode. Such a keypress indication can be the result of pressing the favorites button 492 (FIG. 4) for a sustained duration, or pressing the add/delete favorites button 594 on the remote control device 580. The user could have highlighted a particular display channel that is or is not a favorite channel (e.g., using the navigation buttons 485 while in the display favorites mode to highlight a non-favorite channel). If the selected channel is not a favorite channel (step 2228), step 2230 includes adding the selected channel to a favorite channel list.

If the selected channel is a favorite channel (step 2228), step 2232 includes deleting the favorite channel from a favorite channel list. One example for implementing this deletion action with the remote control device 480 (FIG. 4) includes pressing the favorites button 492 (FIG. 4) for a sustained duration, or pressing the add/delete favorites button 594 (FIG. 5). From this point, the user can scroll to and add or delete another channel or exit from the display favorites mode, among other actions.

Figure 23:
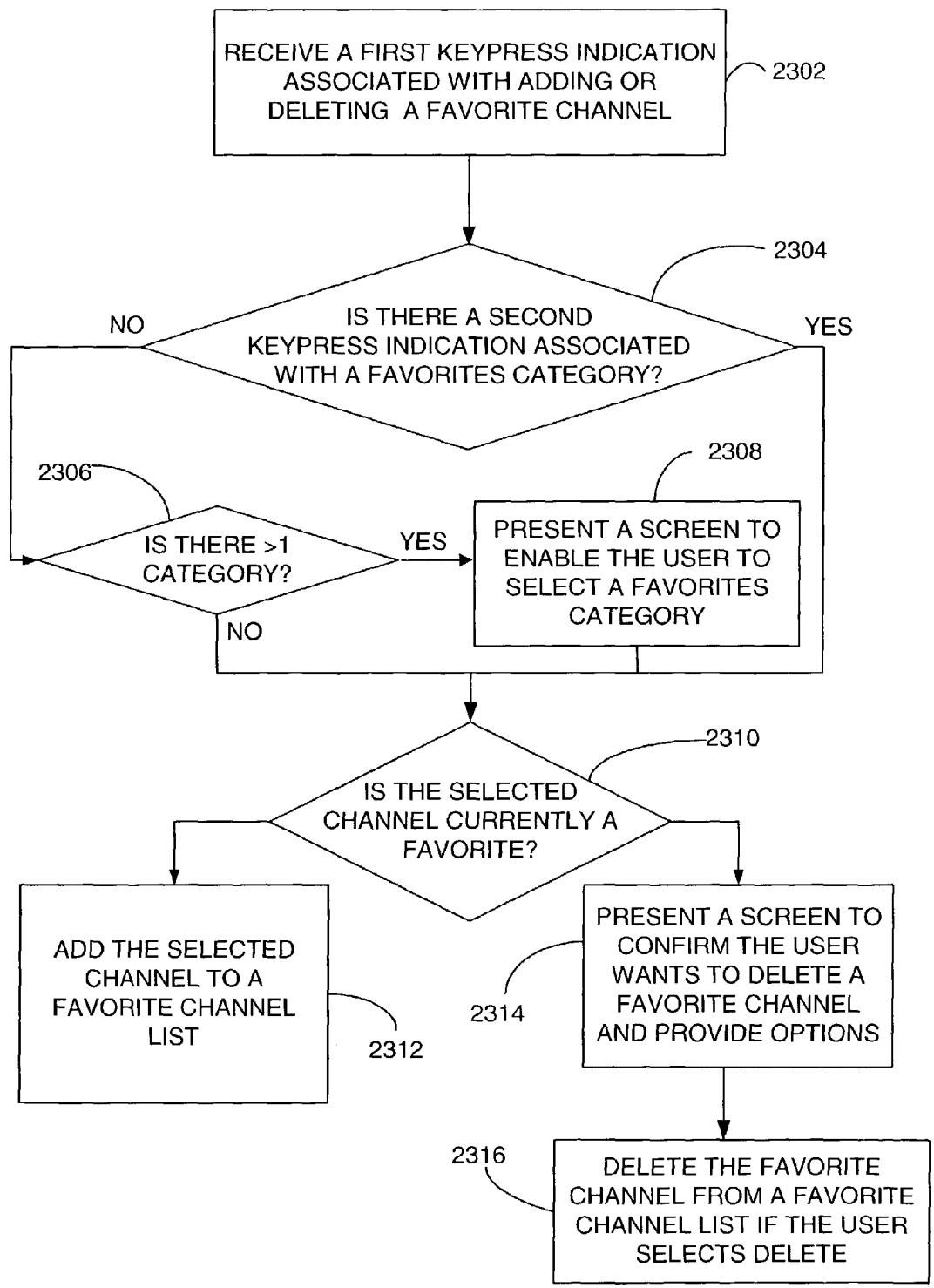
FIG. 23 is a flow diagram of one example method for adding or deleting one or more favorite channels to/from a favorite channel list with the remote control devices of FIGS. 4 and 5 without commencing a display favorites mode, in accordance with one embodiment of the invention.

FIG. 23 is a flow diagram of one example method for adding or deleting one or more favorite channels from a favorite channel list with the remote control devices 480 (FIG. 4) or 580 (FIG. 5) without commencing a display favorites mode, in accordance with one embodiment of the invention. Step 2302 includes receiving a first keypress indication associated with adding a channel to or deleting a channel from a favorite channel list. For example, the user can press the favorites button 492 (FIG. 4) for a sustained duration or the user can press the add/delete favorites button 594 (FIG. 5). Step 2304 includes an internal query as to whether a second keypress indication (associated with a favorites category) has been received within a pre-defined time limit from the first keypress indication, similar to the process described in FIG. 22A. If a second keypress indication is not received, a further internal query determines whether more than one favorites category exists (step 2306) (or in some embodiments, whether one exists at all, as described above in association with FIG. 22A). If not, then the example method proceeds to step 2310. If more than one category exists, and the second keypress indication was not received within the pre-defined time limit, a user interface screen is presented (step 2308) to instruct the user to select a favorites category. In response to the user selecting a favorites category (or if only one category exists), step 2310 includes determining whether the selected channel is currently a favorite channel. Step 2312 includes adding the selected channel to a favorite channel list if the current selection is not a favorite channel. If the selected channel is currently a favorite channel, step 2314 includes presenting a user interface screen to confirm to the user that his or her action will indeed delete a favorite channel, as well as providing other options. If the user selects the option associated with proceeding with the deletion, then the selection is deleted (step 2316), otherwise other actions are taken depending on the option selected.

The blocks in the flow diagrams of FIGS. 22-23 should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The navigator application 355 can be implemented in hardware, software, firmware, or a combination thereof. In the preferred embodiment(s), the navigator application 355 are implemented in software or firmware that is stored in a memory and that is executed by a suitable instruction execution system. If implemented in hardware, as in an alternative embodiment, the navigator application 355 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The navigator application 355 which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred embodiments" are merely possible examples of implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

Therefore, having thus described the invention, at least the following is claimed:

1. A method for prompting and navigating favorite channels with a remote control device, the method comprising the steps of:
   while presenting either an interactive program guide or a media content instance presentation, receiving a first keypress indication associated with commencing a display favorites mode;
   responsive to receiving the first keypress indication, determining whether more than one favorites category exists; and
   responsive to the determination, providing a user interface screen when more than one favorites category exists, wherein a message in the user interface screen prompts the user to select a favorites category before commencing the display favorites mode, otherwise commencing the display favorites mode for a default favorites category responsive to the determination.

2. The method of claim 1, further including receiving a second keypress indication to select the favorites category.

3. The method of claim 2, further including, responsive to receiving the second keypress indication, commencing the display favorites mode for the selected favorites category.

4. The method of claim 3, wherein the display favorites mode for the selected favorites category is configured to enable a user to scroll among favorite channels in increasing and decreasing channel number directions.

5. The method of claim 4, further including the steps of scrolling to a next higher numbered favorite channel in response to receiving a channel up keypress indication.

6. The method of claim 4, further including the steps of scrolling to a next lower numbered favorite channel in response to receiving a channel down keypress indication.

7. The method of claim 3, further including the steps of receiving a third keypress indication, similar to the first keypress indication, and responsively exiting from the display favorites mode for the selected favorites category.

8. The method of claim 7, wherein the steps of receiving the first keypress indication and the third keypress indication are responsive to the user activating a favorites button located on a remote control device.

9. The method of claim 7, wherein the step of receiving the first keypress indication and the third keypress indication are responsive to the user activating a display favorites button located on a remote control device.

10. The method of claim 3, further including the steps of, responsive to commencing the display favorites mode for the selected favorites category, presenting favorites symbols in proximity to the favorite channels presented in an interactive program guide screen.

11. The method of claim 10, wherein one of the favorite channels presented in the interactive program guide screen is highlighted.

12. The method of claim 3, further including the steps of, responsive to commencing the display favorites mode for the selected favorites category, presenting a favorites symbol in proximity to a media content instance presentation screen associated with the favorite channel that is tuned to and displayed in response to commencing the display favorites mode for the selected favorites category.

13. A method for prompting favorite channels with a remote control device, the method comprising the steps of:
   while presenting either an interactive program guide or a media content instance presentation, receiving a first keypress indication associated with commencing a display favorites mode; and
   receiving an alphanumeric keypress indication a defined threshold duration after receiving the first keypress indication, wherein the alphanumeric keypress indication is associated with a favorites category, wherein the alphanumeric keypress indication is associated with a key corresponding to entry of a number, single letter, or a combination of a letter and number.

14. The method of claim 13, wherein responsive to receiving the first keypress indication and the alphanumeric keypress indication, the display favorites mode that commences is associated with the favorites category.

15. A method for adding and deleting favorite channels, the method comprising the steps of:
   receiving a first keypress indication associated with adding a first favorite channel to a favorite channel list that is transparent to a user at a time corresponding to the reception of the first keypress indication; and
   responsive to the first keypress indication, adding the first favorite channel to the favorite channel list; and
   presenting a media content instance presentation on a screen display associated with the first favorite channel corresponding to a time of receiving the first keypress indication and to a time of adding the first favorite channel to the favorite channel list.

16. The method of claim 15, further including the step of deleting a second favorite channel from the favorite channel list by receiving a second keypress indication associated with deleting the second favorite channel from the favorite channel list, wherein the favorite channel list is transparent to the user.

17. The method of claim 16, further including the step of presenting a media content instance presentation on a screen display associated with the second favorite channel corresponding to a time of receiving the second keypress indication and to a time of deleting the second favorite channel from the favorite channel list.

18. A method for adding and deleting favorite channels, the method comprising the steps of:
   receiving a first keypress indication associated with adding a first favorite channel to a favorite channel list that is transparent to a user at a time corresponding to the reception of the first keypress indication;
   responsive to the first keypress indication, adding the first favorite channel to the favorite channel list; and
   presenting the first favorite channel as a highlighted entry in an interactive program guide screen corresponding to a time of receiving the first keypress indication and to a time of adding the first favorite channel to the favorite channel list.

19. The method of claim 18, further including the steps of deleting a second favorite channel by receiving a second keypress indication associated with deleting the second favorite channel from the favorite channel list, wherein the favorite channel list is transparent to the user.

20. The method of claim 19, further including the step of presenting a user interface screen that includes a message that advises a user that a keypress corresponding to the second keypress indication will result in the deletion of the second favorite channel, wherein the user interface further provides the user with options that include at least one of continuing to proceed with the deletion, disregarding the last keypress, adding to another favorites channel category, and deleting from another favorites channel category.

21. The method of claim 19, wherein the second keypress indication results from a user activating a favorites button for a sustained duration.

22. The method of claim 19, wherein the second keypress indication results from a user activating an add/delete favorites button.

23. The method of claim 19, further including the step of presenting the second favorite channel as a highlighted entry in an interactive program guide screen corresponding to a time of receiving the second keypress indication and to a time of deleting the second favorite channel from the favorite channel list.

24. The method of claim 18, wherein the first keypress indication results from a user activating a favorites button for a sustained duration.

25. The method of claim 18, wherein the first keypress indication results from a user activating an add/delete favorites button.

26. The method of claim 18, further including the step of receiving an alphanumeric keypress indication a defined threshold duration after receiving the first keypress indication, wherein the alphanumeric keypress indication is associated with a favorites category.

27. The method of claim 26, wherein responsive to receiving the first keypress indication and the alphanumeric keypress indication, the channel list the first favorite channel is added to is associated with the favorites category.

28. The method of claim 18, wherein the steps of receiving and adding occur while in a display favorites mode.

29. The method of claim 18, further including the step of presenting feedback to the user when the first favorite channel is successfully added to the favorite channel list.

30. The method of claim 18, further including the step of providing a user interface screen when more than one favorites category exists and the first keypress indication is not followed after a defined threshold an alphanumeric keypress indication associated with a favorites channel category, wherein the user interface screen instructs the user to select a favorites category.

31. A system for prompting and navigating favorite channels with a remote control device, the system comprising:
a memory with logic; and
a processor configured with the logic to receive a first keypress indication associated with commencing a display favorites mode while presenting either an interactive program guide or a media content instance presentation, wherein responsive to receiving the first keypress indication, the processor is further configured with the logic to determine whether more than one favorites category exists, wherein responsive to the determination, the processor is configured with the logic to provide a user interface screen, when more than one favorites category exists, wherein a message in the user interface screen prompts the user to select a favorites category before commencing the display favorites mode, otherwise the processor is configured with the logic to commence the display favorites mode for a default favorites category responsive to the determination.

32. The system of claim 31, wherein the processor is further configured with the logic to enable a user to scroll among favorite channels in increasing and decreasing channel number directions.

33. The system of claim 32, wherein the processor is further configured with the logic to scroll to a next higher numbered favorite channel in response to receiving a channel up keypress indication.

34. The system of claim 32, wherein the processor is further configured with the logic to scroll to a next lower numbered favorite channel in response to receiving a channel down keypress indication.

35. The system of claim 31, wherein the processor is further configured with the logic to receive a second keypress indication to select the favorites category.

36. The method of claim 35, wherein the processor is further configured to commence the display favorites mode in response to the second keypress indication.

37. The system of claim 36, wherein the processor is further configured with the logic to receive a third keypress indication, similar to the first keypress indication, and responsively exit from the display favorites mode for the selected favorites category.

38. The system of claim 37, wherein the processor is further configured with the logic to receive the first keypress indication and the third keypress indication responsive to the user activating a favorites button located on a remote control device.

39. The system of claim 37, wherein the processor is further configured with the logic to receive the first keypress indication and the third keypress indication responsive to the user activating a display favorites button located on a remote control device.

40. The system of claim 36, wherein the processor is further configured with the logic to, responsive to commencing the display favorites mode for the selected favorites category, present favorites symbols in proximity to the favorite channels presented in an interactive program guide screen.

41. The system of claim 40, wherein the processor is further configured with the logic to highlight one of the favorite channels presented in the interactive program guide screen.

42. The system of claim 36, wherein the processor is further configured with the logic to, responsive to commencing the display favorites mode for the selected favorites category, present a favorites symbol in proximity to a media content instance presentation screen associated with the favorite channel that is tuned to and displayed in response to commencing the display favorites mode for the selected favorites category.

43. A system for prompting favorite channels with a remote control device, the system comprising:
a memory with logic; and
a processor configured with the logic to receive a first keypress indication associated with commencing a display favorites mode while presenting either an interactive program guide or a media content instance presentation, wherein the processor is further configured with the logic to receive an alphanumeric keypress indication a defined threshold duration after receiving the first keypress indication, wherein the alphanumeric keypress indication is associated with a favorites category, wherein the alphanumeric keypress indication is associated with a key corresponding to entry of a number, single letter, or a combination of a letter and number.

44. The system of claim 43, wherein the processor is further configured with the logic to, responsive to receiving the first keypress indication and the alphanumeric keypress indication, to associate the display favorites mode that commences with the favorites category.

45. A system for adding and deleting favorite channels, the system comprising:

a memory with logic; and a processor configured with the logic to receive a first keypress indication associated with adding a first favorite channel to a favorite channel list that is transparent to a user at a time corresponding to the reception of the first keypress indication, wherein the processor is further configured with the logic to, responsive to the first keypress indication, add the first favorite channel to the favorite channel list, wherein the processor is further configured with the logic to present a media content instance presentation on a screen display associated with the first favorite channel corresponding to a time of receiving the first keypress indication and to a time of adding the first favorite channel to the favorite channel list.

46. The system of claim 45, wherein the processor is further configured with the logic to delete a second favorite channel from the favorite channel list by receiving a second keypress indication associated with deleting the second favorite channel from the favorite channel list, wherein the favorite channel list is transparent to the user.

47. The system of claim 46, wherein the processor is further configured with the logic to present a media content instance presentation on a screen display associated with the second favorite channel corresponding to a time of receiving the second keypress indication and to a time of deleting the second favorite channel from the favorite channel list.

48. A system for adding favorites channels, the system comprising:

a memory with logic; and a processor configured with the logic to receive a first keypress indication associated with adding a first favorite channel to a favorite channel list that is transparent to a user at a time corresponding to the reception of the first keypress indication, wherein the processor is further configured with the logic to, responsive to the first keypress indication, add the first favorite channel to the favorite channel list, wherein the processor is further configured with the logic to present the first favorite channel as a highlighted entry in an interactive program guide screen corresponding to a time of receiving the first keypress indication and to a time of adding the first favorite channel to the favorite channel list.

49. The system of claim 48, wherein the processor is further configured with the logic to delete a second favorite channel by receiving a second keypress indication associated with deleting the second favorite channel from the favorite channel list, wherein the favorite channel list is transparent to the user.

50. The system of claim 49, wherein the processor is further configured with the logic to present a user interface screen that includes a message that advises a user that a keypress corresponding to the second keypress indication will result in the deletion of the second favorite channel, wherein the user interface further provides the user with options that include at least one of continuing to proceed with the deletion, disregarding the last keypress, adding to another favorite channel category, and deleting from another favorite channel category.

51. The system of claim 49, wherein the second keypress indication results from a user activating a favorites button for a sustained duration.

52. The system of claim 49, wherein the second keypress indication results from a user activating an add/delete favorites button.

53. The system of claim 49, wherein the processor is further configured with the logic to present the second favorite channel as a highlighted entry in an interactive program guide screen corresponding to a time of receiving the second keypress indication and to a time of deleting the second favorite channel from the favorite channel list.

54. The system of claim 48, wherein the first keypress indication results from a user activating a favorites button for a sustained duration.

55. The system of claim 48, wherein the first keypress indication results from a user activating an add/delete favorites button.

56. The system of claim 48, wherein the processor is further configured with the logic to receive an alphanumeric keypress indication a defined threshold duration after receiving the first keypress indication, wherein the processor is further configured with the logic to associate the alphanumeric keypress indication with a favorites category.

57. The system of claim 56, wherein the processor is further configured with the logic to, responsive to receiving the first keypress indication and the alphanumeric keypress indication, add the first favorite channel to the favorite channel list associated with the favorites category.

58. The system of claim 48, wherein the processor is further configured with the logic to receive the first keypress indication and add to and delete from the favorite channel list while in a display favorites mode.

59. The system of claim 48, wherein the processor is further configured with the logic to present feedback to the user when the first favorite channel is successfully added to the favorite channel list.

60. The system of claim 48, wherein the processor is further configured with the logic to provide a user interface screen when more than one favorites category exists and the first keypress indication is not followed after a defined threshold an alphanumeric keypress indication associated with a favorites channel category, wherein the user interface screen instructs the user to select a favorites category.

* * * * *